United States Patent
Grudzien

(10) Patent No.: US 7,624,643 B2
(45) Date of Patent: Dec. 1, 2009

(54) METHOD AND APPARATUS FOR FORMING A REFERENCE PRESSURE WITHIN A CHAMBER OF A CAPACITANCE SENSOR

(75) Inventor: Chris P. Grudzien, Haverhill, MA (US)

(73) Assignee: MKS Instruments, Inc., Andover, MA (US)

( * ) Notice: Subject to any disclaimer, the term of this patent is extended or adjusted under 35 U.S.C. 154(b) by 630 days.

(21) Appl. No.: 11/542,316

(22) Filed: Oct. 3, 2006

(65) Prior Publication Data

US 2007/0023140 A1    Feb. 1, 2007

Related U.S. Application Data

(62) Division of application No. 10/960,153, filed on Oct. 7, 2004, now Pat. No. 7,137,301.

(51) Int. Cl.
*G01L 9/12* (2006.01)
(52) U.S. Cl. .......................... 73/718; 73/724
(58) Field of Classification Search .................. 73/718, 73/724

See application file for complete search history.

(56) References Cited

U.S. PATENT DOCUMENTS

| 1,619,444 | A | 3/1927 | Taylor |
| 2,416,557 | A | 2/1947 | Wiener |
| 2,751,530 | A | 6/1956 | Armstrong |
| 2,753,515 | A | 7/1956 | Rickner |

(Continued)

FOREIGN PATENT DOCUMENTS

DE    1 282 302    11/1968

(Continued)

OTHER PUBLICATIONS

Bal Sal Engineering Company, Inc., Santa Ana, California, Bal Sal Canted Coil Spring Gaskets, pp. 3.2-2 and 3.2-14.
Baratron® Absolute Pressure Transmitters 400 Series, © 1996 MKS Instruments, Inc., Andover, MA.

(Continued)

*Primary Examiner*—Andre J Allen
(74) *Attorney, Agent, or Firm*—Wilmer Cutler Pickering Hale & Dorr LLP.

(57) ABSTRACT

The present invention is directed at methods and apparatuses for facilitating the establishment of a reference pressure within a reference chamber of a pressure transducer. The transducer has a housing and a cover, the housing defining a reference chamber and an aperture. A meltable sealing material is disposed on at least one of the cover and the housing. The apparatus includes a pressure chamber that is rotatable between a first position and a second position, a pressure source that is connected to the pressure chamber, a guide that is attachable to the transducer near the aperture, and a heater for selectively heating the pressure chamber to a temperature sufficiently high to melt the sealing material. The cover is positioned in an internal space of the guide. The guide is attached to the transducer near the aperture. The transducer, cover and guide are placed in the pressure chamber, the pressure chamber is rotated to the first position and a pressure is generated in the pressure chamber via the pressure source. After a reference pressure has been established in the reference chamber, the pressure chamber is rotated to the second position. Gravity causes the cover to move within the space towards the aperture when the pressure chamber is rotated to the second position. The heater then heats the pressure chamber to melt the sealing material. Upon cooling, the sealing material forms a seal that seals the reference pressure in the reference chamber of the transducer.

16 Claims, 12 Drawing Sheets

U.S. PATENT DOCUMENTS

| | | |
|---|---|---|
| 2,755,419 A | 7/1956 | Hollmann |
| 2,800,796 A | 7/1957 | Westcott et al. |
| 2,907,320 A | 10/1959 | Weese et al. |
| 2,999,386 A | 9/1961 | Wolfe |
| 3,000,215 A | 9/1961 | Atanasoff et al. |
| 3,113,459 A | 12/1963 | Slater |
| 3,153,847 A | 10/1964 | Lindberg |
| 3,243,998 A | 4/1966 | Vosteen |
| 3,318,153 A | 5/1967 | Lode |
| 3,354,721 A | 11/1967 | Fiske |
| 3,371,537 A | 3/1968 | Kiene |
| 3,460,310 A | 8/1969 | Adcock et al. |
| 3,619,742 A | 11/1971 | Rud, Jr. |
| 3,620,083 A | 11/1971 | Dimeff et al. |
| 3,675,072 A | 7/1972 | Hahn et al. |
| 3,858,097 A | 12/1974 | Polye |
| 3,952,234 A | 4/1976 | Birchall |
| 3,968,695 A | 7/1976 | Weiss et al. |
| 4,008,619 A | 2/1977 | Alcaide et al. |
| 4,011,901 A | 3/1977 | Flemings et al. |
| 4,020,674 A | 5/1977 | Fechter et al. |
| 4,084,438 A | 4/1978 | Lee et al. |
| 4,084,439 A | 4/1978 | Teter et al. |
| 4,091,683 A | 5/1978 | Delatorre |
| 4,120,206 A | 10/1978 | Rud, Jr. |
| 4,136,603 A | 1/1979 | Doyle, Jr. |
| 4,141,252 A | 2/1979 | Lodge |
| 4,168,517 A | 9/1979 | Lee |
| 4,168,518 A | 9/1979 | Lee |
| 4,176,557 A | 12/1979 | Johnston |
| 4,178,621 A | 12/1979 | Simonelic et al. |
| 4,227,419 A | 10/1980 | Park et al. |
| 4,229,776 A | 10/1980 | Antikainen et al. |
| 4,302,063 A | 11/1981 | Rudy |
| 4,322,775 A | 3/1982 | Delatorre |
| 4,334,725 A | 6/1982 | Teshima et al. |
| 4,343,188 A | 8/1982 | Baker |
| 4,357,834 A | 11/1982 | Kimura et al. |
| 4,358,814 A | 11/1982 | Lee et al. |
| 4,381,492 A | 4/1983 | Steingroever et al. |
| 4,389,895 A | 6/1983 | Rud, Jr. |
| 4,413,524 A | 11/1983 | Kosh |
| 4,422,125 A | 12/1983 | Antonazzi et al. |
| 4,422,335 A | 12/1983 | Ohnesorge et al. |
| 4,424,713 A | 1/1984 | Kroninger, Jr. et al. |
| 4,425,799 A | 1/1984 | Park |
| 4,426,673 A | 1/1984 | Bell et al. |
| 4,433,580 A | 2/1984 | Tward |
| 4,434,203 A | 2/1984 | Briefer |
| 4,458,537 A | 7/1984 | Bell et al. |
| 4,464,725 A | 8/1984 | Briefer |
| 4,495,820 A | 1/1985 | Shimada et al. |
| 4,499,773 A | 2/1985 | Crampton et al. |
| 4,523,474 A * | 6/1985 | Browne et al. ............... 73/724 |
| 4,542,436 A | 9/1985 | Carusillo |
| 4,562,742 A | 1/1986 | Bell |
| 4,567,773 A | 2/1986 | Cooper et al. |
| 4,572,204 A | 2/1986 | Stephens |
| 4,587,851 A | 5/1986 | Mortberg |
| 4,598,381 A | 7/1986 | Cucci |
| 4,603,371 A | 7/1986 | Frick |
| 4,617,607 A | 10/1986 | Park et al. |
| 4,628,403 A | 12/1986 | Kuisma |
| 4,670,733 A | 6/1987 | Bell |
| 4,679,643 A | 7/1987 | Bove |
| 4,691,574 A | 9/1987 | Delatorre |
| 4,703,658 A | 11/1987 | Mrozack, Jr. et al. |
| 4,714,464 A | 12/1987 | Newton |
| 4,730,496 A | 3/1988 | Knecht et al. |
| 4,733,875 A | 3/1988 | Azuma et al. |
| 4,735,090 A | 4/1988 | Jeffrey et al. |
| 4,735,098 A | 4/1988 | Kavli et al. |
| 4,738,276 A | 4/1988 | Adams |
| 4,748,861 A | 6/1988 | Matsumoto et al. |
| 4,765,188 A | 8/1988 | Krechmery et al. |
| 4,769,738 A | 9/1988 | Nakamura et al. |
| 4,774,626 A | 9/1988 | Charboneau et al. |
| 4,785,669 A | 11/1988 | Benson et al. |
| 4,807,477 A | 2/1989 | Myers et al. |
| 4,815,324 A | 3/1989 | Tada et al. |
| 4,823,603 A | 4/1989 | Ferran et al. |
| 4,831,492 A | 5/1989 | Kuisma |
| 4,850,227 A | 7/1989 | Luettgen et al. |
| 4,851,015 A | 7/1989 | Wagner et al. |
| 4,864,463 A | 9/1989 | Shkedi et al. |
| 4,875,368 A | 10/1989 | Delatorre |
| 4,881,939 A | 11/1989 | Newman |
| 4,898,035 A | 2/1990 | Yajima et al. |
| 4,920,805 A | 5/1990 | Yajima et al. |
| 4,935,841 A | 6/1990 | Johsson et al. |
| 4,943,032 A | 7/1990 | Zdeblick |
| 4,944,187 A | 7/1990 | Frick et al. |
| 4,977,480 A | 12/1990 | Nishihara |
| 5,001,595 A | 3/1991 | Dittrich et al. |
| 5,005,421 A | 4/1991 | Hegner et al. |
| 5,020,377 A | 6/1991 | Park |
| 5,048,165 A | 9/1991 | Cadwell |
| 5,050,034 A | 9/1991 | Hegner et al. |
| 5,134,887 A | 8/1992 | Bell |
| 5,150,275 A | 9/1992 | Lee et al. |
| 5,155,653 A | 10/1992 | Kremidas |
| 5,165,281 A | 11/1992 | Bell |
| 5,186,055 A | 2/1993 | Kovacich et al. |
| 5,188,780 A | 2/1993 | Lange et al. |
| 5,189,591 A | 2/1993 | Bernot |
| 5,249,469 A | 10/1993 | Johsson et al. |
| 5,257,542 A | 11/1993 | Voss |
| 5,271,277 A | 12/1993 | Pandorf |
| 5,275,055 A | 1/1994 | Zook et al. |
| 5,279,163 A | 1/1994 | D'Antonio et al. |
| 5,291,534 A | 3/1994 | Sakurai et al. |
| 5,311,140 A | 5/1994 | Permuy |
| 5,315,877 A | 5/1994 | Park et al. |
| 5,333,637 A | 8/1994 | Gravel |
| 5,343,754 A | 9/1994 | Stone |
| 5,343,755 A | 9/1994 | Huss |
| 5,348,568 A | 9/1994 | Oda et al. |
| 5,349,492 A | 9/1994 | Kimura et al. |
| 5,349,865 A | 9/1994 | Kavli et al. |
| 5,351,548 A | 10/1994 | Briggs et al. |
| 5,351,938 A | 10/1994 | Hegner et al. |
| 5,369,228 A | 11/1994 | Faust |
| 5,400,489 A | 3/1995 | Hegner et al. |
| 5,442,962 A | 8/1995 | Lee |
| 5,443,410 A | 8/1995 | Ko |
| 5,485,345 A | 1/1996 | Lukasiewicz et al. |
| 5,497,620 A | 3/1996 | Stobbe |
| 5,499,158 A | 3/1996 | Bishop et al. |
| 5,499,533 A | 3/1996 | Miller et al. |
| 5,507,080 A | 4/1996 | Hayashi et al. |
| 5,525,280 A | 6/1996 | Shukla et al. |
| 5,531,128 A | 7/1996 | Ryhanen |
| 5,539,611 A | 7/1996 | Hegner et al. |
| 5,541,561 A | 7/1996 | Grunert et al. |
| 5,542,300 A | 8/1996 | Lee |
| 5,544,399 A | 8/1996 | Bishop et al. |
| 5,544,490 A | 8/1996 | Manimi et al. |
| 5,561,247 A | 10/1996 | Mutoh et al. |
| 5,571,970 A | 11/1996 | Mutoh et al. |
| 5,603,684 A | 2/1997 | Wetmore et al. |
| 5,604,315 A | 2/1997 | Briefer et al. |
| 5,625,152 A | 4/1997 | Pandorf et al. |
| 5,667,758 A | 9/1997 | Matsugi et al. |
| 5,719,740 A | 2/1998 | Hayashi et al. |

| | | | | | | |
|---|---|---|---|---|---|---|
| 5,756,899 | A | 5/1998 | Ugai et al. | EP | 0 490 807 A2 | 6/1992 |
| 5,800,235 | A | 9/1998 | Ragsdale | EP | 549 229 A2 | 6/1993 |
| 5,808,206 | A | 9/1998 | Pandorf et al. | EP | 1369676 | 12/2003 |
| 5,811,685 | A | 9/1998 | Grudzien, Jr. | FR | 895938 | 2/1945 |
| 5,836,063 | A | 11/1998 | Hegner et al. | GB | 1 497 212 A | 1/1978 |
| 5,885,682 | A | 3/1999 | Tanimoto et al. | GB | 2 044 523 | 10/1980 |
| 5,911,162 | A | 6/1999 | Denner | GB | 2 162 837 | 2/1986 |
| 5,916,479 | A | 6/1999 | Schiabel et al. | GB | 2 188 155 | 9/1987 |
| 5,920,015 | A | 7/1999 | Hallberg et al. | JP | 5600 7112 | 1/1981 |
| 5,925,824 | A | 7/1999 | Soma et al. | JP | 56 040918 | 4/1981 |
| 5,932,332 | A | 8/1999 | Pandorf et al. | JP | 56-162026 A2 | 12/1981 |
| 5,939,639 | A | 8/1999 | Lethbridge | JP | 60 120833 | 6/1985 |
| 5,942,692 | A | 8/1999 | Haase et al. | JP | 62 172117 | 7/1987 |
| 5,948,169 | A | 9/1999 | Wu | JP | 01204022 A | 8/1989 |
| 5,965,821 | A | 10/1999 | Grudzien | JP | 01 281691 | 11/1989 |
| 6,012,335 | A | 1/2000 | Bashir et al. | JP | 5-172675 A2 | 7/1993 |
| 6,019,002 | A | 2/2000 | Lee | JP | 11 502627 | 3/1999 |
| 6,029,524 | A | 2/2000 | Kauder et al. | SU | 1362971 | 7/1986 |
| 6,029,525 | A | 2/2000 | Grudzien | WO | WO-95/06236 | 3/1995 |
| 6,105,436 | A | 8/2000 | Lischer et al. | WO | WO-95/28623 | 10/1995 |
| 6,105,437 | A | 8/2000 | Klug et al. | WO | WO-95/28624 A1 | 10/1995 |
| 6,112,597 | A | 9/2000 | Tschope | WO | WO-97/26518 A1 | 7/1997 |
| 6,119,524 | A | 9/2000 | Kobold | WO | WO-98/37392 | 8/1998 |
| 6,122,976 | A | 9/2000 | Hallberg et al. | WO | WO-98/37393 | 8/1998 |
| 6,148,674 | A | 11/2000 | Park et al. | WO | WO-98/59228 | 12/1998 |
| 6,205,861 | B1 | 3/2001 | Lee | WO | WO-99/01731 | 1/1999 |
| 6,209,398 | B1 | 4/2001 | Fowler et al. | WO | WO-99/32866 | 7/1999 |
| 6,315,734 | B1 | 11/2001 | Nunome | WO | WO-99/40405 | 8/1999 |
| 6,340,929 | B1 | 1/2002 | Katou et al. | WO | WO-00/43745 | 7/2000 |
| 6,423,949 | B1 | 7/2002 | Chen et al. | WO | WO-01/07883 | 2/2001 |
| 6,439,056 | B1 | 8/2002 | Jonsson | WO | WO-01/18516 A1 | 3/2001 |
| 6,443,015 | B1 | 9/2002 | Poulin et al. | WO | WO-01/25740 | 4/2001 |
| 6,451,159 | B1 | 9/2002 | Lombardi et al. | WO | WO-01/25742 | 4/2001 |
| 6,516,671 | B2 | 2/2003 | Romo et al. | WO | WO-02/14821 A2 | 2/2002 |
| 6,528,008 | B1 | 3/2003 | Bjoerkman | WO | WO-02/31458 A2 | 4/2002 |
| 6,568,274 | B1 * | 5/2003 | Lucas et al. ............... 73/718 | WO | WO-02/054034 A1 | 7/2002 |
| 6,578,427 | B1 | 6/2003 | Hegner | WO | WO-03/056289 A1 | 7/2003 |
| 6,581,471 | B1 | 6/2003 | Grudzien | WO | WO-03/078952 A2 | 9/2003 |
| 6,588,280 | B1 | 7/2003 | Quigley et al. | WO | WO-03/089891 A1 | 10/2003 |
| 6,591,687 | B1 | 7/2003 | Bjoerkman et al. | WO | WO-2004/104543 | 12/2004 |
| 6,612,176 | B2 | 9/2003 | Poulin et al. | WO | WO-2006/041719 A2 | 4/2006 |
| 6,735,845 | B2 | 5/2004 | Jonsson | WO | WO-2006/041720 | 4/2006 |
| 6,772,640 | B1 | 8/2004 | Quigley et al. | WO | WO-2006/076745 A1 | 7/2006 |
| 6,845,664 | B1 | 1/2005 | Okojie | | | |
| 6,846,380 | B2 * | 1/2005 | Dickinson et al. ...... 156/345.31 | | | |
| 6,892,745 | B2 | 5/2005 | Benson | | | |
| 6,901,808 | B1 | 6/2005 | Sharpless et al. | | | |
| 6,941,814 | B2 | 9/2005 | Hegner et al. | | | |
| 6,948,374 | B2 * | 9/2005 | Miyashita ................. 73/718 | | | |
| 6,964,501 | B2 | 11/2005 | Ryan | | | |
| 2002/0026835 | A1 | 3/2002 | Jacob et al. | | | |
| 2002/0183885 | A1 | 12/2002 | Goder et al. | | | |
| 2003/0003618 | A1 | 1/2003 | Fujii et al. | | | |
| 2003/0110865 | A1 | 6/2003 | Johsson | | | |
| 2003/0118802 | A1 | 6/2003 | Bjoerkman | | | |
| 2003/0167852 | A1 | 9/2003 | Traverso | | | |
| 2004/0002655 | A1 | 1/2004 | Bolorforosh et al. | | | |
| 2004/0012942 | A1 | 1/2004 | Bjoerkman et al. | | | |
| 2004/0076215 | A1 | 4/2004 | Baumbach | | | |
| 2004/0119038 | A1 | 6/2004 | Crockett et al. | | | |
| 2004/0182165 | A1 * | 9/2004 | Miyashita ................. 73/718 | | | |
| 2005/0075573 | A1 | 4/2005 | Park et al. | | | |
| 2005/0134167 | A1 | 6/2005 | Deguchi et al. | | | |
| 2005/0262946 | A1 | 12/2005 | Jonsson | | | |

FOREIGN PATENT DOCUMENTS

| | | |
|---|---|---|
| DE | 40 11 901 A1 | 10/1991 |
| DE | 41 11 118 A1 | 10/1992 |
| DE | 4 136 995 A1 | 5/1993 |
| DE | 42 07 951-A-1 | 9/1993 |
| EP | 275 844 | 7/1988 |
| EP | 0 473 109 A2 | 3/1992 |

OTHER PUBLICATIONS

Baratron® General Purpose Absolute Pressure Transducers, 1993 MKS Instruments, Inc.

Beynon, J.D.E. et al., "A Simple Micromanometer," 1964, J. Sci. Instruments, vol. 41, No. 2, pp. 111-112.

Cook, D.B. et al., "A Simple Diaphragm Micromanometer," 1953, J. Scientific Instruments, vol. 30, pp. 238-239.

Derwent's Abstract 88-197466/28, week 8828, Abstract of SU, 1362971, Dec. 30, 1987.

Derwent's abstract No. 91-199892/27, week 9127, Abstract of SU, 1605145 (Mikhailov, P.G.), Nov. 7, 1990 (Accessesion No. 8695871).

Derwent's abstract No. 91-199893/27, week 9127, Abstract of SU, 1605146 (Pukhov, V.N.) Nov. 7, 1990.

English Translation from Russian of SU 1362971, Semenov et al., Method for the Evacuation of Absolute-Pressure Sensors and Device for the Carrying Out of the Method, Dec. 1987.

European Patent Office, International Search Report for PCT/US00/19177 mailed Sep. 25, 2000, 3 pages.

European Patent Office, International Search Report for PCT/US00/24862 mailed Dec. 7, 2000, pp. 2 pages.

European Patent Office, International Search Report for PCT/US00/26696 mailed Dec. 21, 2000, 2 pages.

European Patent Office, International Search Report for PCT/US00/26721 mailed Dec. 20, 2000, 3 pages.

European Patent Office, International Search Report for PCT/US01/24836 mailed May 10, 2002, 5 pages.

European Patent Office, International Search Report for PCT/US01/31521 mailed Apr. 24, 2002, 2 pages.

European Patent Office, International Search Report for PCT/US01/50848 mailed May 2, 2002, 2 pages.

European Patent Office, International Search Report for PCT/US02/40282 mailed Apr. 15, 2003, 2 pages.

European Patent Office, International Search Report for PCT/US2004/014639 mailed Oct. 7, 2004, 3 pages.

European Patent Office, International Search Report for PCT/US2005/035167 mailed Mar. 22, 2006, 3 pages.

European Patent Office, International Search Report for PCT/US2005/035170 mailed Feb. 27, 2006, 3 pages.

European Patent Office, International Search Report for PCT/US2006/002757 mailed Apr. 20, 2006, 3 pages.

European Patent Office, International Search Report for PCT/US98/13458 mailed Aug. 28, 1998, 2 pages.

European Patent Office, International Search Report for PCT/US98/16645 mailed Sep. 24, 1998, 5 pages.

European Patent Office, International Search Report for PCT/US99/00563 mailed Apr. 28, 1999, 3 pages.

Instrument Specialities, Product Design & Shielding Selection Guide, Fabricated UltraFlex Gaskets, p. 108.

Patent Abstracts of Japan, Abstract of JP-59-56970, Apr. 2, 1984.

Suzuki, Y.,"Flexible Microgripper and its Application to Micromeasurement of Mechanical and Thermal Properties," Micro Electro Mechanical Systems, 1996; Feb. 11-15, 1996; pp. 406-411.

Swedish Patent Office, International Search Report for PCT/SE95/00425 mailed Aug. 1, 1995, 4 pages.

Swedish Patent Office, International Search Report for PCT/SE98/00302 mailed Jun. 24, 1998, 3 pages.

Swedish Patent Office, International Search Report for PCT/SE98/02441 mailed Jun. 23, 1999, 3 pages.

Tecknit, EMI Shield Products, "Custom strips," p. A-3.

\* cited by examiner (Prior art Burn-out and Evacuation Procedure)

(side view)

(front view)

METHOD AND APPARATUS FOR FORMING A REFERENCE PRESSURE WITHIN A CHAMBER OF A CAPACITANCE SENSOR

CROSS-REFERENCE

This application is a divisional application of U.S. patent application Ser. No. 10/960,153, filed Oct. 7, 2004.

BACKGROUND OF THE INVENTION

The present invention relates to capacitive pressure transducers. More specifically, the present invention relates to an improved method and apparatus for forming a reference pressure within a chamber of a capacitive pressure transducer assembly.

FIG. 1A depicts a cross-sectional side view of an assembled prior art capacitive pressure transducer assembly 10. FIG. 1B is an exploded view of the upper housing 40, diaphragm 56 and lower housing 60 of FIG. 1A. Briefly, capacitive pressure transducer assembly 10 includes a body that defines an interior cavity. A relatively thin, flexible ceramic diaphragm 56 divides the interior cavity into a first sealed interior chamber 52 and a second sealed interior chamber 54. As will be discussed in greater detail below, diaphragm 56 is mounted so that it flexes, moves, or deforms, in response to pressure differentials in chambers 52 and 54. Transducer assembly 10 provides a parameter that is indicative of the amount of diaphragm flexure and this parameter is therefore indirectly indicative of the differential pressure between chambers 52 and 54. The parameter provided by transducer assembly 10 indicative of the differential pressure is the electrical capacitance between diaphragm 56 and one or more conductors disposed on an upper housing 40.

Capacitive pressure transducer assembly 10 includes a ceramic upper housing 40 and a ceramic lower housing 60. The upper housing 40, which generally has a circular shape when viewed from the top, defines an upper face 41, a central lower face 47, an annular shoulder 42 that has a lower face 42a and an annular channel 43 that is located between the central lower face 47 and the annular shoulder 42. Lower face 42a of the annular shoulder 42 is substantially co-planar with central lower face 47. The upper housing further defines an aperture (or passageway) 48 that extends through the housing 40 from the upper side to the lower side. A metallic conductor 46 is disposed on a center portion of the lower face 47.

The diaphragm 56 is generally a circular thin diaphragm that has an upper face 57 and an opposite, lower, face 59. A metallic conductor 58 is disposed on a center portion of upper face 57 of the diaphragm 56. The diaphragm 56 and the upper housing 40 are arranged so that the conductor 46 of the upper housing 40 is disposed opposite to the conductor 58 of the diaphragm 56. Diaphragm 56 is coupled to the upper housing 40 by a high-temperature air-tight seal (or joint) 70. The seal 70 is located between the lower face 42a of the annular shoulder 42 of the upper housing 40 and a corresponding annular portion of face 57 of diaphragm 56. When sealed, the upper housing 40, seal 70 and diaphragm 56 define reference chamber 52. A reference pressure is established and maintained in the reference chamber 52. Aperture 48 provides an inlet or entry way into reference chamber 52.

The lower housing 60, which generally has a circular shape, defines a central opening 64 and an upwardly projecting annular shoulder 62 that has an upper face 62a. The upper face 62a of shoulder 62 of the lower housing 60 is coupled to a corresponding portion of lower face 59 of diaphragm 56 by a high-temperature air-tight seal (or joint) 76. Seal 76 can be deposited and fabricated in a manner similar to that of seal 70. When sealed, the lower housing 60, seal 76 and face 59 of the diaphragm 56 define process chamber 54.

A pressure tube 66 having an inlet passageway 68 is coupled to the lower housing 60 by a seal, for example, so that the inlet passageway 68 is aligned with the opening 64 of the lower housing 60. Accordingly, the process chamber 54 is in fluid communication, via opening 64 and inlet passageway 68, with an external environment. In operation, the capacitive pressure transducer assembly 10 measures the pressure of this external environment.

Conductors 46 and 58 of the capacitive pressure transducer assembly 10 form parallel plates of a variable capacitor C. As is well known, $C = A\epsilon_r\epsilon_0/d$, where C is the capacitance between two parallel plates, A is the common area between the plates, $\epsilon_0$ is the permittivity of a vacuum, $\epsilon_r$ is the relative permittivity of the material separating the plates (e.g., $\epsilon_r=1$ for vacuum), and d is the axial distance between the plates (i.e., the distance between the plates measured along an axis normal to the plates). So, the capacitance provided by capacitor C is a function of the axial distance between conductor 46 and conductor 58. As the diaphragm 56 moves or flexes up and down, in response to changes in the pressure differential between chambers 52 and 54, the capacitance provided by capacitor C also changes. At any instant in time, the capacitance provided by capacitor C is indicative of the instantaneous differential pressure between chambers 52 and 54. Known electrical circuits (e.g., a "tank" circuit characterized by a resonant frequency that is a function of the capacitance provided by capacitor C) may be used to measure the capacitance provided by capacitor C and to provide an electrical signal representative of the differential pressure. Conductors 46, 58 can be comprised of a wide variety of conductive materials such as gold or copper, for example, and can be fabricated via known thin and thick film processes or other known fabrication methods. When thin film processes are utilized, conductors 46, 48 may have thicknesses of about 1 μm, for example.

Diaphragm 56 is often made from aluminum oxide. Other ceramic materials, such as ceramic monocrystalline oxide materials, however, may also be used. Capacitance sensors having ceramic components are disclosed in U.S. Pat. Nos. 5,920,015 and 6,122,976.

As noted above, changes in the differential pressure between chambers 52, 54 cause diaphragm 56 to flex thereby changing the gap between conductor 46 and conductor 58. Measurement of changes in the gap permits measurement of the differential pressure. The gap, however, can also be affected by factors unrelated to pressure. For example, the gap can be affected by changes in temperature. Since the components of transducer assembly 10 can be made from a variety of different materials, each of which has its own characteristic coefficient of thermal expansion, temperature changes in the ambient environment can cause the diaphragm 56 to move closer to, or further away from, conductor 46. Fortunately, changes in the gap caused by temperature changes are characteristically different than changes in the gap caused by changes in differential pressure. To compensate for changes in the gap that are caused due to changes in the ambient temperature, it is known to include a second conductor (not shown) that is disposed adjacent to conductor 46 on the lower face 47 of the upper housing 40. In such an embodiment, conductors 46 and 58 form parallel plates of a variable capacitor C1 and conductor 58 and the second conductor form parallel plates of a variable capacitor C2. The two capacitors, C1 and C2, may be used by known methods to reduce the transducer's sensitivity to temperature changes.

The upper housing 40 is positioned so that the lower face 47, and any conductors disposed thereon, are disposed in a plane that is parallel to the plane defined by the conductor 58 (i.e., diaphragm 56) when the pressures in chambers 52, 54 are equal. As discussed above, the capacitance defined by the conductors 46, 58 depends upon the gap (i.e., axial distance) that exists between these opposing conductors. The gap, which is relatively small (e.g., on the order of 0.0004 inches (10-12 µm)), depends, in part, upon the thickness of the seal 70 and the shape and configuration of the upper housing 40 (e.g., the amount that lower face 42a is out of plane, i.e. offset, with lower face 47, if any).

In operation, capacitive pressure transducer assembly 10 is normally used as an absolute pressure transducer. In this form, reference chamber 52 is evacuated to essentially zero pressure, e.g., less than $10^{-8}$ Torr, and the reference chamber 52 is then sealed. The reference pressure then serves as a baseline from which a pressure within the process chamber 54 is determined. To maintain the essentially zero pressure within the reference chamber 52, the transducer assembly 10 includes a tube 80, a cover 82, a hold-wire 86, a screen 88 and a getter element 84. As is shown in FIGS. 1A and 1B, the screen 88 supports the getter element 84 within a hollow portion of the tube 80 while the hold-wire 86 maintains the getter element 84 against the screen 88. The hollow portion of the tube 80 is disposed over the aperture 48 of the upper housing 40 so that the getter element 84 is in fluid communication with the reference chamber 52. In addition to supporting the getter element 84, screen 88 also prevents particles from passing into the reference 52 that could adversely affect the operation of the diaphragm 56.

The bottom end of the tube 80 is coupled to the upper face 41 of the upper housing 40 around the aperture 48 by a high-temperature air-tight seal 92, while the cover 82 is coupled to the upper end of the tube 80 by a low-temperature air-tight seal 94. Seals 92, 94 and seal 70, which is located between the shoulder 42 of the upper housing 40 and the diaphragm 56, all assist in maintaining the reference pressure that is established in the reference chamber 52. The high-temperature seal 92 is comprised of a high-temperature glass material while the low-temperature seal 94 is comprised of a low-temperature glass material. To form the high-temperature seal 92, the high-temperature glass material is deposited on the lower end of the tube 80, a corresponding sealing area of face 41, or both. The high-temperature glass material is melted, a force perpendicular to the upper face 41 of the upper housing 40 is applied between the tube 80 and the upper housing 40 and the high-temperature glass material is then allowed to cool (i.e., solidify) thus forming the high-temperature air-tight seal 92. The low-temperature seal 94 is similarly formed between the upper end of the tube 80 and a corresponding sealing area of the cover 82. The high-temperature glass material of the high-temperature seal 92 has a melting temperature that is higher than that of the low-temperature glass material of the low-temperature seal 94. To provide different melting temperatures, the glass materials of the seals 92, 94 can be comprised of different materials or have different amounts of a common material. The melting temperature of the high-temperature seal 92 is higher than the melting temperature(s) of the high-temperature seals 70 and 76 and the melting temperature(s) of the high-temperature seals 70 and 76 is higher than the melting temperature of the low-temperature seal 94.

The getter element 84 is comprised of a material that, when activated, acts to effectively absorb any gaseous impurities that may be present within the sealed reference chamber 52. Thus, when activated, the getter element 84 assists in maintaining the reference pressure at an ultra high vacuum level for long periods of time, e.g., ten or more years.

Although an ultra high vacuum pressure, i.e., essentially zero pressure, is a convenient and useful reference pressure, other reference pressures can also be used. After the reference pressure has been established in chamber 52, the pressure tube 66 is then connected to a source of fluid (not shown) to permit measurement of the pressure of that fluid. Coupling the pressure tube 66 in this fashion delivers the fluid, the pressure of which is to be measured, to process chamber 54 (and to the lower face 59 of the diaphragm 56). The center of diaphragm 56 moves or flexes up or down in response to the differential pressure between chamber 52 and 54 thereby changing the capacitance of capacitor C. Since the instantaneous capacitance of capacitor C is indicative of the position of the diaphragm 56, transducer assembly 10 permits measurement of the pressure in chamber 54 relative to the reference pressure that is established in chamber 52.

The accuracy of the capacitive pressure transducer assembly 10 can depend upon the accuracy at which the reference pressure can be established and maintained in the reference chamber 52. In other words, as the actual pressure within the reference chamber 52 deviates from an intended and designed reference pressure, the performance of the capacitive pressure transducer assembly 10 will correspondingly suffer.

The steps of establishing a reference pressure in the reference chamber 52, activating the getter element 84 and sealing the cover 82 to the tube 80 are typically the last few steps that are performed when fabricating capacitive pressure transducer assembly 10. Thus, the steps of coupling the upper housing 40 to the diaphragm 56 via the high-temperature seal 70, coupling the lower housing 60 to the diaphragm 56 via the high-temperature seal 76, coupling the pressure tube 66 to the lower housing 60 around the opening 64, and coupling the tube 80 (having the screen 88, getter element 84 and hold-wire 86) to the face 41 of the upper housing 40 around the aperture 48 via the high-temperature seal 92 will usually have already been completed before the reference pressure is established.

To establish a reference pressure within the reference chamber 52, the reference chamber 52 is typically subjected to a burn-out and evacuation process and then the cover 82 is sealed to the tube 80. The reference chamber 52 is "burned-out" by heating the inner surfaces that define the reference chamber 52 (including the surfaces of the cover 82, tube 80, housing 40 that are in fluid communication with the reference chamber 52), and the chamber 52 is "evacuated" by drawing an ultra-high vacuum on the reference chamber 52. The burn-out heat vaporizes the contaminants, e.g., volatiles, moisture, that may be present on these inner surfaces while the evacuation vacuum draws the vaporized contaminants and gases out of the reference chamber 52. Since the cover 82 has not yet been sealed to the tube 80, the contaminants and gases are sucked out of the reference chamber 52, the aperture 48 and the hollow portion of the tube 80. Once the burn-out and evacuation process is completed and while the vacuum pressure is continuing to be maintained, the cover 82 is then sealed to the tube 80 via the low-temperature seal 94 to establish the reference pressure in the reference chamber 52.

FIGS. 2A and 2B illustrate a prior art method and apparatus that is used to establish a reference pressure within the reference chamber 52 of a capacitive pressure transducer assembly 10. FIG. 2A generally depicts the burn-out and evacuation process while FIG. 2B generally depicts the process by which the cover 82 is sealed onto the upper end of the tube 80. The apparatus includes a vacuum housing 93 that defines an interior vacuum chamber 95. Referring to FIG. 2A, a low-temperature sealing material 94a is deposited on the upper end of the tube 80. The semi-completed transducer assembly 10, i.e., one that does not yet have the cover 82 sealed to the tube 80, is then disposed in the vacuum chamber 95. After the transducer assembly 10 has been placed in the vacuum chamber 95, the vacuum housing 93 is placed in an oven (not shown), a vacuum source (not shown) is coupled to the vacuum chamber 95 and the burn-out and evacuation process of the reference 52 is initiated. During the burn-out and evacuation process, which can last for more than 20 hours, the transducer assembly 10 is heated to a temperature of about 250° C. and an ultra-high vacuum pressure of the order of $10^{-8}$ Torr (or less) is generated in the vacuum chamber 95. In FIG. 2A, the burn-out and evacuation of reference chamber 52 (and aperture 48 and tube 80) is indicated by the arrows which extend from the reference chamber 52, up through the aperture 48 and up through and out of the top end of the tube 80.

After the burn-out and evacuation of the reference chamber 52 is completed, the cover 82 is then coupled to the tube 80 by the low-temperature seal 94. Cover 82 is attached and sealed to the tube 80 without opening vacuum housing 93 so as to preserve the vacuum in reference chamber 52. Accordingly, as can been seen in FIG. 2A, prior to initiating the burn-out and evacuation process, the cover 82 is attached to an end of a rod 96 which penetrates into the vacuum chamber 95 of the vacuum housing 93. When the burn-out and evacuation process is completed, the rod 96 can be actuated to bring the cover 82 in contact with the low-temperature sealing material 94a that is disposed on the upper end of the tube 80.

The low-temperature sealing material 94a that forms the low-temperature seal 94 is not melted during the burn-out and evacuation process, i.e., the burn-out temperature is generally set below the melting temperature of the low-temperature sealing material 94a. Moreover, the burn-out and evacuation process should not compromise the seals that have already been formed in the transducer assembly 10 (e.g., high-temperature seals 70, 76 and 92) and, thus, the burn-out temperature should not exceed the melting temperatures of these seals.

A high-temperature dynamic seal 99 (e.g., a gasket) is disposed in the vacuum housing 93 where the rod 96 penetrates the vacuum housing 93. The high-temperature dynamic seal 99 allows to the rod to travel freely up and down while assisting to maintain the pressure that is present in the vacuum chamber 95 of the vacuum housing 93.

Prior to initiating the burn-out and evacuation process, cover 82 is attached to the end of the rod 96 by a low-temperature seal 98. The melting temperature (i.e., melting point) of the low-temperature seal 98, which is lower than the melting temperature of the low-temperature sealing material 94a, is higher than the burn-out temperature and, therefore, does not melt during the burn-out and evacuation process. The rod 96 extends through the high-temperature dynamic seal 99 and, together with the cover 82, is aligned with the tube 80 of the transducer assembly 10.

Referring now to FIG. 2B, after the burn-out and evacuation process is completed, while the pressure in the vacuum chamber 95 is still being maintained, the rod 96/cover 82 is lowered until the cover 82 comes into contact with the low-temperature sealing material 94a. The temperature within the vacuum chamber 95 (as directed by the oven) is then elevated to cause the low-temperature sealing material 94a to melt. This increase in temperature also causes the low-temperature seal 98 to melt and causes the getter element 84 to become activated. To form the low-temperature air-tight seal 94 between the cover 82 and the tube 80, the temperature within the vacuum chamber 95 is decreased until the low-tempera-ture sealing material 94a solidifies and, while the low-temperature seal 98 is sufficiently melted, the rod 96 is pulled away from the transducer assembly 10. Once the low-temperature seal 94 is formed—and the reference pressure in the reference chamber 52 is thus established—the temperature in the vacuum chamber 95 is reduced to ambient temperature, then vacuum source is disconnected and the assembled transducer assembly 10 is removed from the vacuum housing 93.

FIG. 3 illustrates the prior art burn-out, evacuation and sealing process of the apparatus and method of FIGS. 2A and 2B in more detail. In FIG. 3, the x-axis of the process flow represents Time and the y-axis represents Temperature in degrees Celsius. Prior to initiating the burn-out and evacuation process, at Step A of the process flow, the cover 82 is attached to rod 96 via low-temperature seal 98 and the transducer assembly 10, cover 82 and rod 96 are placed in the vacuum chamber 95 (FIG. 2A). During Step A→B, the temperature in the vacuum chamber 95 is raised to a burn-out temperature of 250° C. and the pressure is lowered to an evacuation pressure of $10^{-8}$ Torr. Step A→B is completed in three hours. After the burn-out temperature and evacuation pressure are achieved (Step B), the reference chamber 52 is burned-out and evacuated for 20 hours, Step B→C. Shortly before Step C is reached, the rod 96 and cover 82 are lowered so that the cover 82 comes into contact with the low-temperature sealing material 94a that is deposited on the upper end of the tube 80. Once the burn-out and evacuation step is completed (Step C), the temperature in the vacuum chamber 95 is raised to 475° C., Step C→D, which causes the low-temperature sealing material 94a and the low-temperature seal 98 to melt. Step C→D lasts for three hours. The vacuum chamber 95 is then maintained at 475° C. for 30 minutes, Step D→E, to ensure that the low-temperature sealing material 94a and the low-temperature seal 98 are sufficiently melted. The temperature in the vacuum chamber 95 is then lowered to 400° C. over the course of two hours, Step E→F, which causes the low-temperature sealing material 94a to solidify and form the low-temperature air-tight seal 94. The melting temperature of the low-temperature seal 98 is below 400° C. and, thus, the low-temperature seal 98 remains melted throughout Step E→F. Shortly before Step F is reached, rod 96 is raised away from the cover 82 (FIG. 2B). Lastly, the temperature and pressure in the vacuum chamber 95 are brought to ambient conditions over the course of 4 hours and the assembled pressure transducer assembly 10 is then removed from the vacuum chamber 95 of the vacuum housing 93, Step F→G. As illustrated in FIG. 3, the prior art burn-out, evacuation and sealing process can be completed in 32 ½ hours.

The method and apparatus described above does not necessarily ensure that an accurate reference pressure has been established within the reference chamber 52 of a capacitive pressure transducer assembly 10. For example, it is very difficult to establish and maintain an ultra high vacuum of the order of $10^{-8}$ Torr (or less) in a vacuum housing 93 that utilizes a rod 96 and a high-temperature dynamic seal 99 because the pressure integrity of the vacuum housing 93 tends to be compromised by the presence of the high-temperature dynamic seal 99. It also can be difficult or costly to accurately control the positions and orientations of the cover 82 and the tube 80 during the rod actuating mating process. If the cover 82 is not positioned or oriented properly in relationship to the tube 80 during the mating process, the integrity of the low-temperature seal 94 may be compromised or the low-temperature seal 94 may fail entirely.

A need therefore exists for a method and apparatus for accurately establishing a reference pressure within a reference chamber of a capacitive pressure transducer assembly.

SUMMARY OF THE INVENTION

The present invention is directed to methods and apparatuses for establishing a reference pressure within a reference chamber of a capacitive pressure transducer assembly.

The pressure transducer includes a cover and a housing that defines a reference chamber and an aperture. A meltable sealing material is disposed on at least one of the cover and the housing. The apparatus includes a pressure chamber that is rotatable between a first position and a second position and a guide that is attachable to the transducer near the aperture. The guide defines an internal space. A cable can be used to rotate the pressure chamber between the first and second positions. An actuator motor and an actuator rod can alternatively be used to rotate the pressure chamber. A pressure source connected to the pressure chamber can establish a desired pressure within the pressure chamber while a heater (e.g., oven) can selectively heat the pressure chamber to a temperature sufficiently high to melt the sealing material.

The cover is positioned in the space of the guide and the guide is attached to the transducer near the aperture. The transducer, cover and guide are placed in the pressure chamber, the pressure chamber is rotated to the first position and a pressure is generated in the pressure chamber via the pressure source and the chamber is heated to bake out unwanted materials. After a reference pressure has been established in the reference chamber, the pressure chamber is rotated to the second position wherein gravity thereby causes the cover to move towards the aperture within the space. The heater then heats the pressure chamber to melt the sealing material. Upon cooling, the sealing material forms a seal that seals the reference pressure in the reference chamber of the transducer.

The apparatus may also include a weight, such as a ball, that is disposed within the space of the guide.

By utilizing an apparatus that has a guide and a rotatable pressure chamber, the methods and apparatuses of the present invention are capable of accurately locating and orienting the cover during the reference chamber sealing process. The methods and apparatuses of the present invention, moreover, do not require the use of a high-temperature dynamic seal to maintain the pressure in the pressure chamber.

BRIEF DESCRIPTION OF THE DRAWINGS

Various objects, features, and advantages of the present invention can be more fully appreciated with reference to the following detailed description of the invention when considered in connection with the following drawing, in which like reference numerals identify like elements. The following drawings are for the purpose of illustration only and are not intended to be limiting of the invention, the scope of which is set forth in the claims that follow.

DETAILED DESCRIPTION

The present invention is directed to methods and apparatuses for accurately establishing a reference pressure within a reference chamber of a capacitive pressure transducer assembly. The present invention is capable of establishing an ultra-high vacuum in a vacuum chamber for facilitating the burn-out and evacuation process of a transducer assembly and is capable of controlling the delivery and mating of an aperture cover during the reference chamber sealing process. Moreover, the present invention does not utilize a high-temperature dynamic seal to maintain the ultra-high vacuum in the vacuum chamber.

Figure 4A:
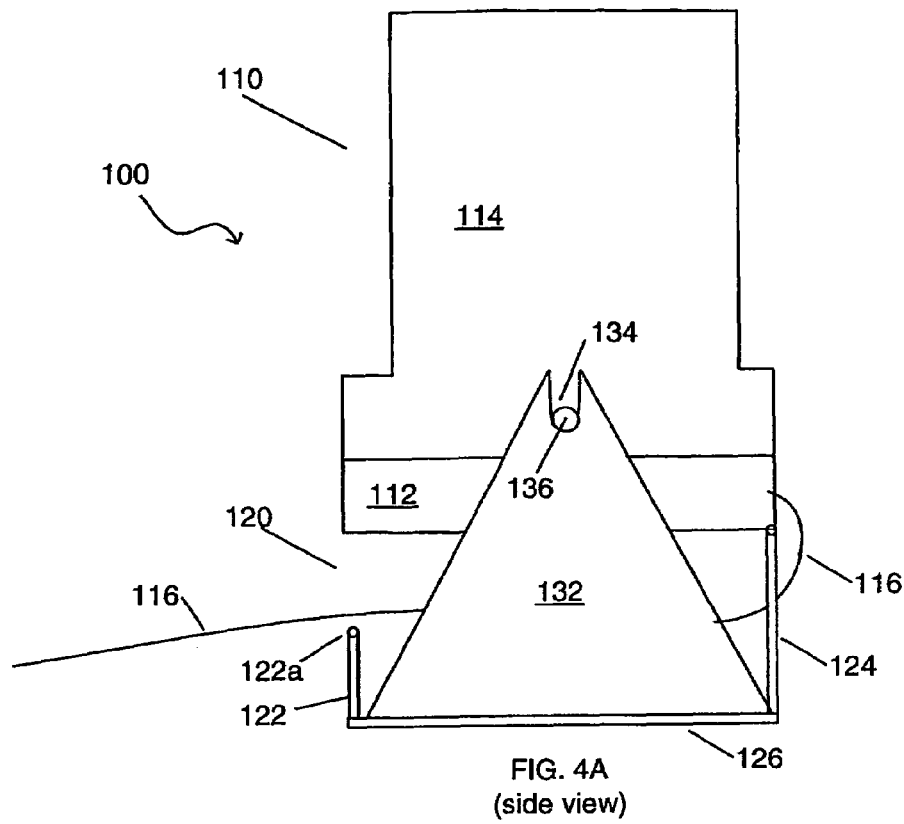
FIG. 4A shows a side view of an apparatus constructed in accordance with the invention for establishing a reference pressure within a reference chamber of a capacitive pressure transducer assembly.
Figure 4B:
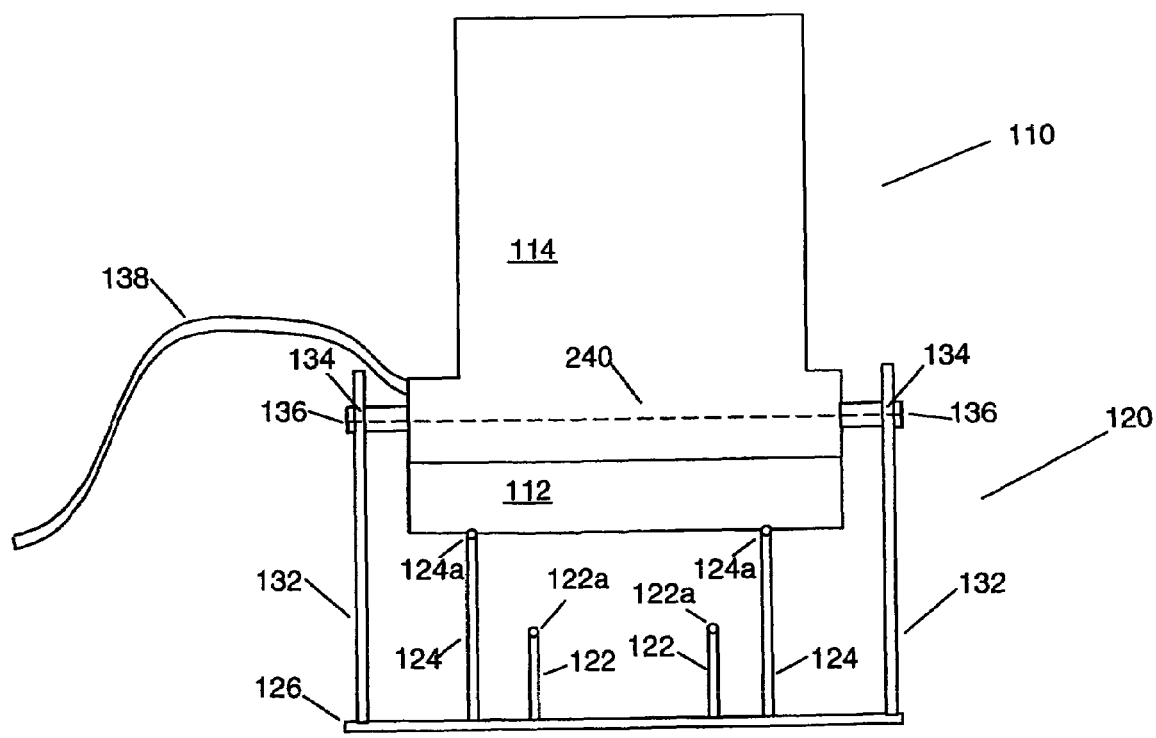
FIG. 4B shows a front view of the apparatus of FIG. 4A.

FIG. 4A depicts a side view of an exemplary apparatus 100 constructed in accordance with the invention. FIG. 4B depicts a front view of the apparatus 100. Apparatus 100 is comprised of a vacuum housing 110 and a support assembly 120. The vacuum housing 110 defines an internal vacuum chamber, which is discussed in more detail below. A capacitive pressure transducer assembly 10 that is to be burned-out, evacuated and sealed is secured within the internal vacuum chamber of the vacuum housing 110. The support assembly 120 supports the vacuum housing 110 when the capacitive pressure transducer assembly 10 is being burned-out, evacuated and sealed and, more specifically, allows the vacuum housing 110 and the capacitive pressure transducer assembly 10 that is disposed therein to be rotated while these processing steps are being performed.

Figure 7A:
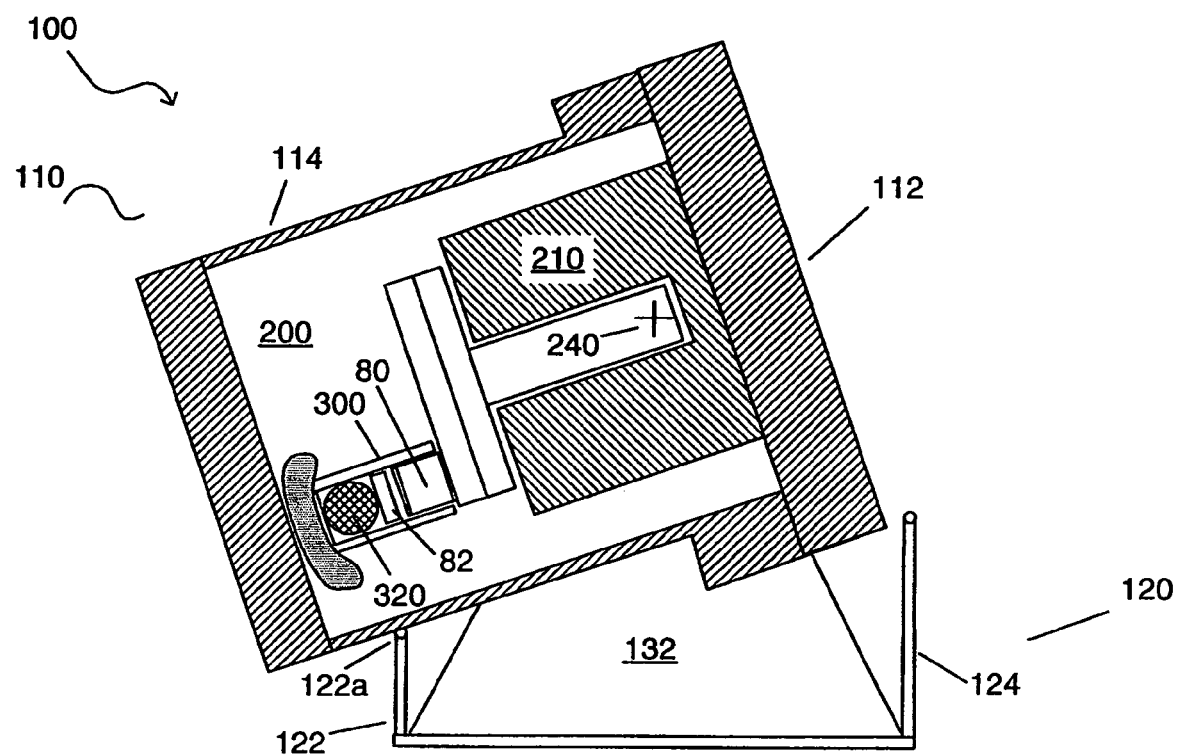
FIG. 7A illustrates one step in an exemplary method of establishing a reference pressure within a reference chamber of a capacitive pressure transducer assembly in accordance with the invention.
Figure 7B:
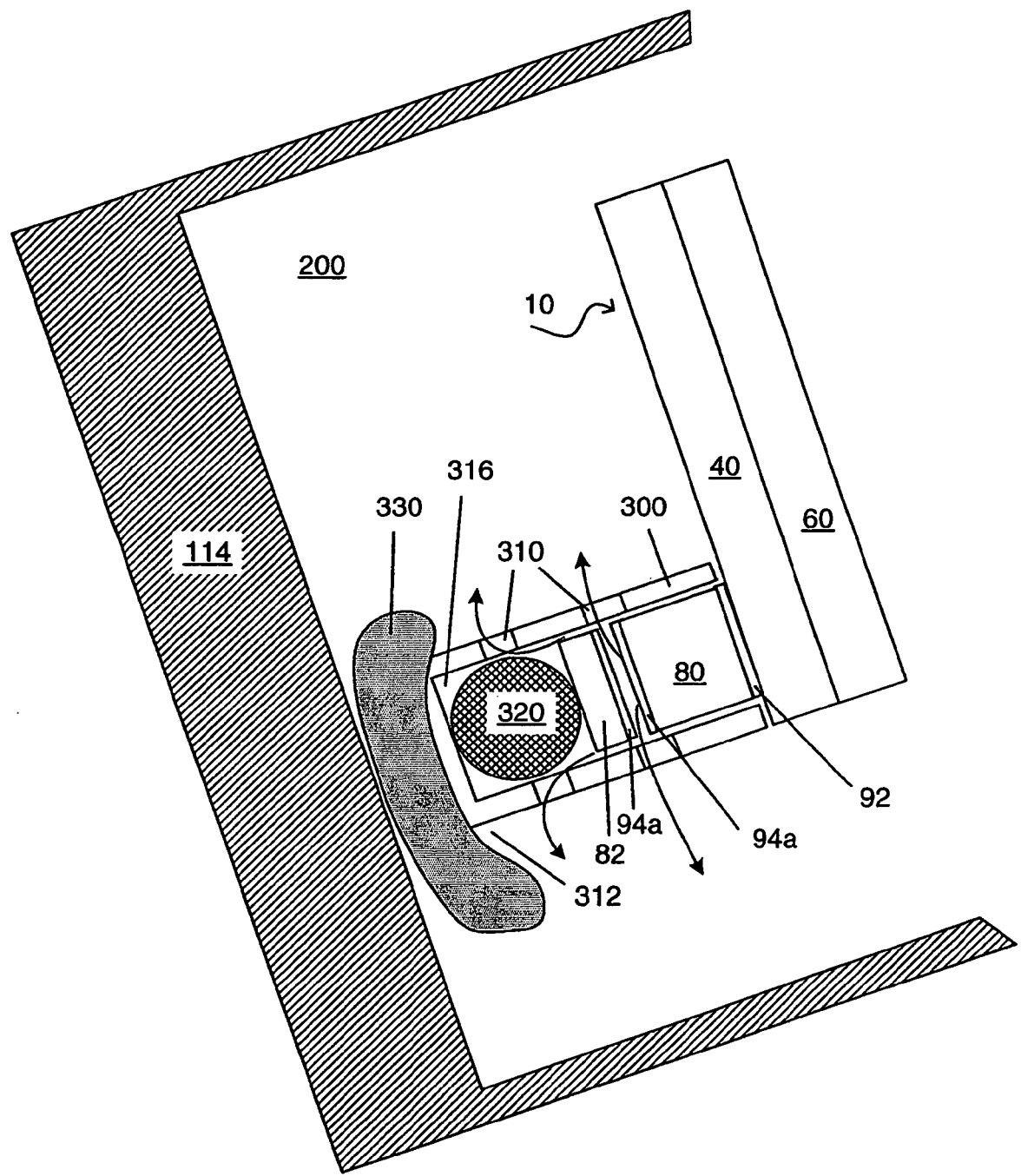
FIG. 7B is a close-up view that further illustrates how the step of FIG. 7A is to be performed.
Figure 8A:
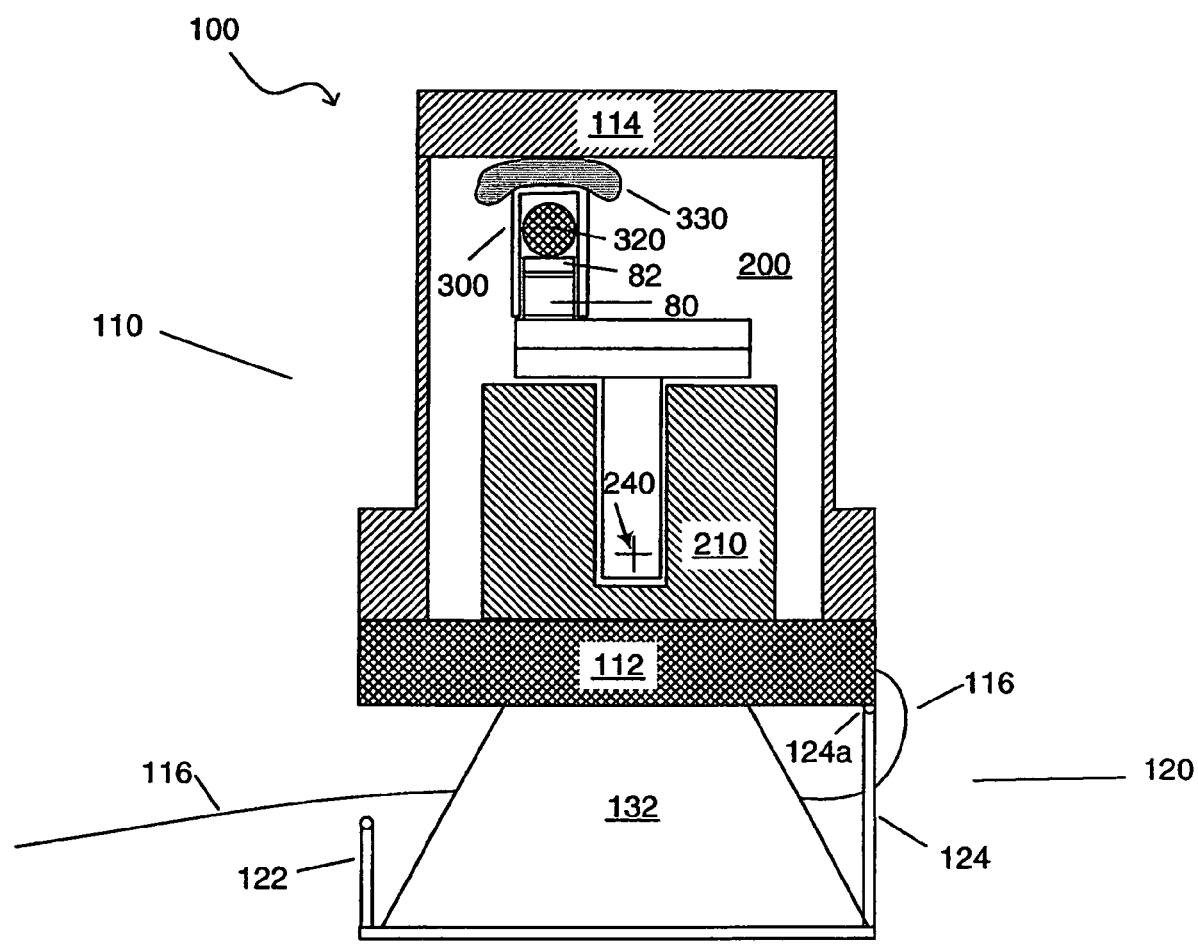
FIG. 8A illustrates another step in an exemplary method of establishing a reference pressure within a reference chamber of a capacitive pressure transducer assembly in accordance with the invention.
Figure 8B:
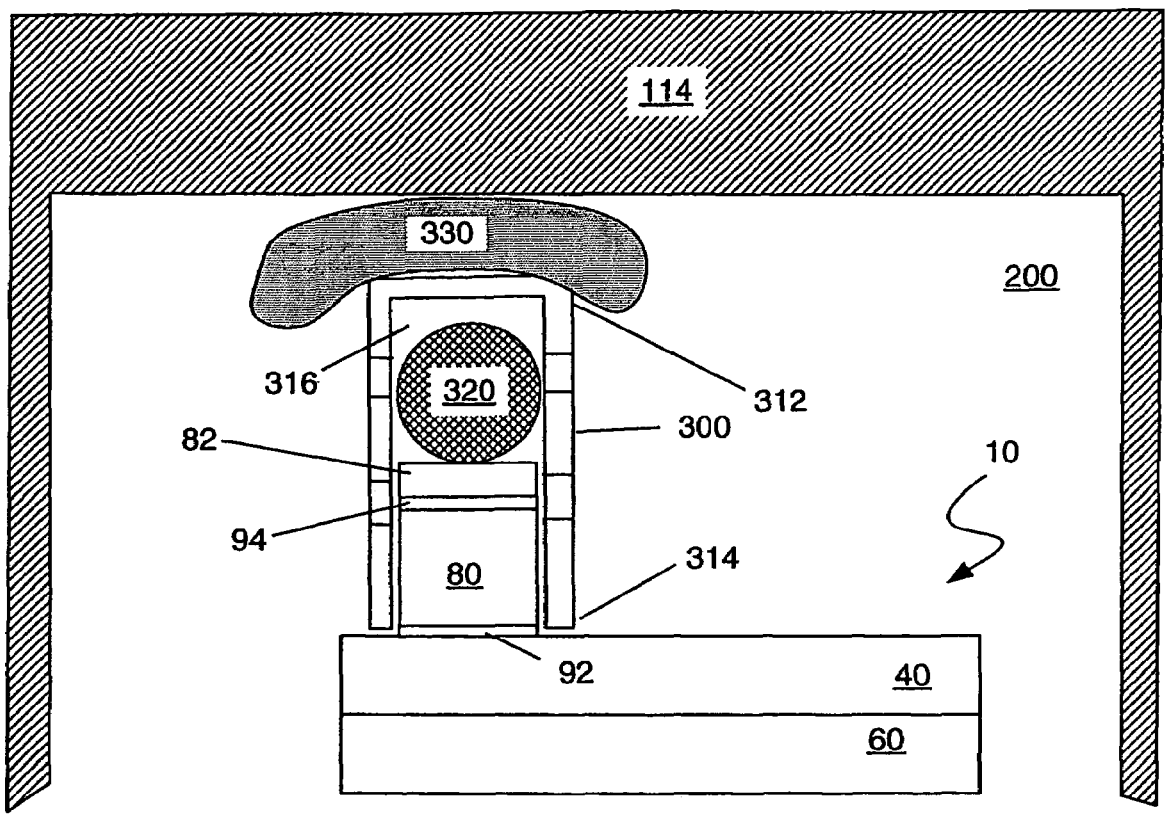
FIG. 8B is a close-up view that further illustrates how the step of FIG. 8A is to be performed.

The vacuum housing 110 includes a metal lower flange 112 and a metal upper housing 114. The vacuum housing 110 also includes left and right pins 136 that are coupled to the upper housing 114 and a vacuum port (not shown) that can be connected to one end of a vacuum line 138. The other end of the vacuum line 138 is connected to a vacuum pump (not shown) that is capable of drawing an ultra-high vacuum. The pins 136 define a rotational axis 240 through which the vacuum housing 110 can rotate when supported by the support assembly 120. The vacuum port is located near the left pin 136, i.e., near the rotational axis 240, so that the vacuum line 138 is subjected to a minimum amount of displacement and flexure when the vacuum housing 110 is rotated. The vacuum housing 110 also includes a cable (or wire) 116 having an end that is coupled to the backside of the lower flange 112. When the vacuum housing 110 is secured in the support assembly 120, i.e., via the pins 136, the cable 116 can be operated to rotate the vacuum housing 110 forward to a downwardly-slanted position (FIGS. 7A and 7B) and backwards to an upright position (FIGS. 8A and 8B).

The support assembly 120 includes a base 126, left and right support brackets 132, two lower supports 122 and two upper supports 124. The support brackets 132, lower supports 122 and upper supports 124 are all mounted on a face of the base 126. The base 126 includes a front edge, a back edge and opposite side edges. As can be seen in FIGS. 4A and 4B, the support brackets 132 are located near the opposite side edges of the base 126, the upper supports 124 are located inboard of the support brackets 132 near the back edge of the base 126 while the lower supports 122 are located inboard of the upper supports 124 near the front edge of the base 126. Each support bracket 132 has a slot (or hole) 134 that can accommodate a pin 136. Each lower support 122 has a distal end 122a and each upper support 124 has a distal end 124a. The vacuum housing 110 is secured in the support assembly 120 by mounting the pins 136 of the upper housing 114 into the slots 134 of the support brackets 132. The slots 134 can be slotted and indexed to accommodate the pins 136 and to facilitate the rotation and loading and unloading of the vacuum housing 110.

After the capacitive pressure transducer assembly 10 has been placed in the vacuum housing 110 and the vacuum housing 110 has been secured to the support assembly 120, the apparatus 100 is placed in an oven (not shown) and the vacuum line 138 is coupled to the vacuum port. To operate the cable 116 at a location that is external to the oven, the opposite end of the cable 116 is routed between the support brackets 132 and out through an access port that is provided in the oven.

As is discussed in more detail below, when the vacuum housing 110 is in an upright position (as shown in FIGS. 4A and 4B), the lower flange 112 of the vacuum housing 100 rests upon the distal ends 124a of the upper supports 124. However, when the vacuum housing 110 is rotated forward (as shown in FIGS. 7A and 7B), the upper housing 114 then comes to rest on the distal ends 122a of the lower supports 122.

Figure 5:
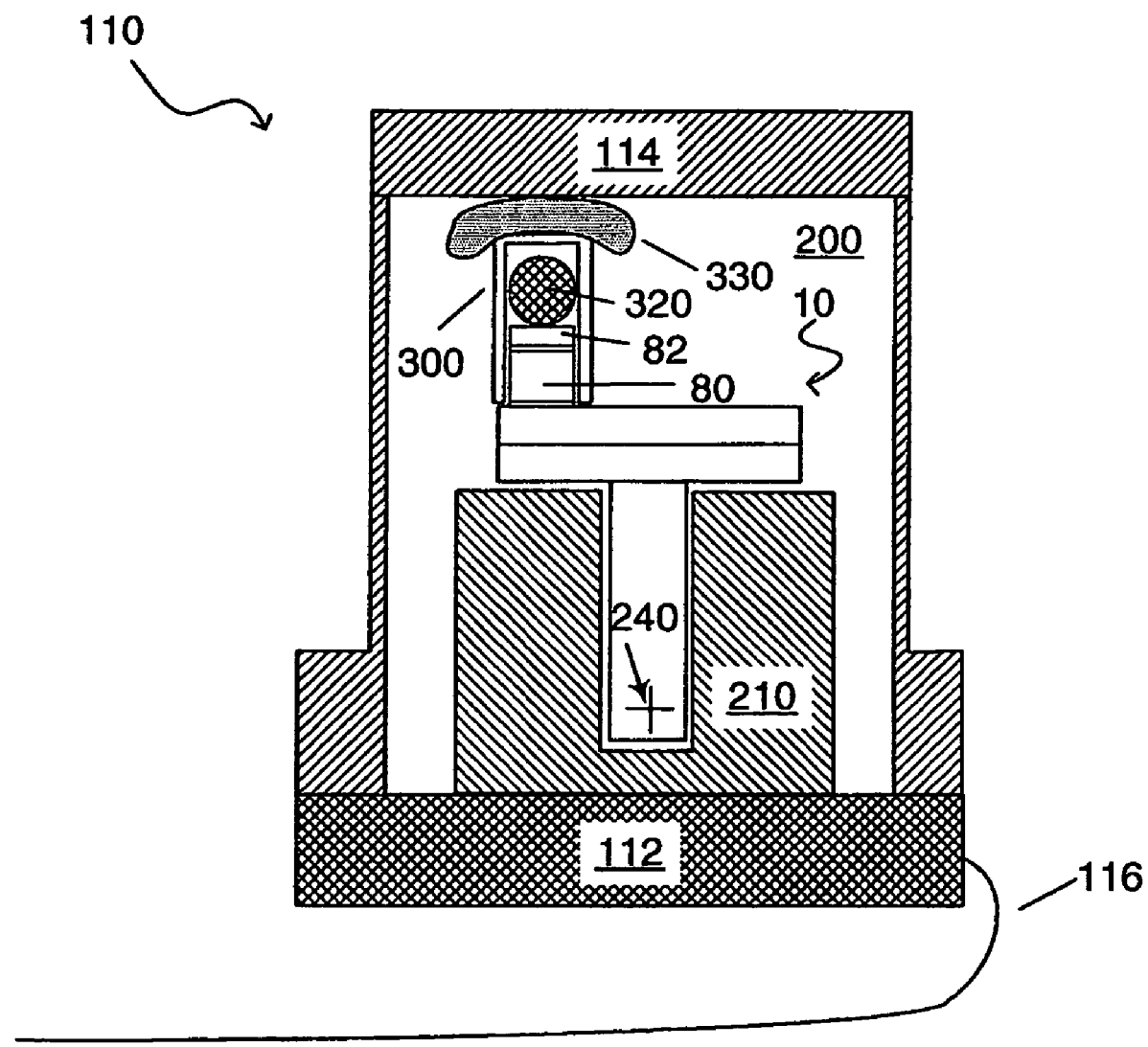
FIG. 5 illustrates a partial, cross-sectional, side-view of the apparatus of FIGS. 4A and 4B that shows the internal components of the apparatus and how the pressure transducer assembly is disposed therein.

FIG. 5, which depicts a cross-sectional, side-view of the vacuum housing 110, shows some additional components of the apparatus 100 and illustrates how the capacitive pressure transducer assembly 10 is secured in the vacuum housing 110. As can be seen in FIG. 5, the vacuum housing 110 also includes a copper sensor support 210 that secures the transducer assembly 10 that is to be burned-out, evacuated and sealed. The transducer assembly 10 can be secured to the sensor support 210 by tightening screws (not shown) or by a wide variety of other types of fastening means that are suitable for temporarily securing the transducer assembly 10 to the sensor support 210. The transducer assembly 10 that is to be secured to the sensor support 210 generally has a low-temperature sealing material 94a deposited on the upper end of the tube 80 and on the corresponding sealing surface of the cover 82.

The apparatus 100 further includes a cylindrical guide assembly 300, a ball 320 and copper wool 330. The ball 320 is disposed within a hollow portion of the guide assembly 300. As is discussed in more detail below, the guide assembly 300 is temporarily coupled to the tube 80 and, together with the ball 320, guides the cover 82 towards the upper end of the tube 80 during the sealing process. The ball 320 is comprised of a high-temperature, high-density material such as Tungsten Carbide or Silicon Nitride, for example. The copper wool 330, which is disposed between the guide assembly 300 and the upper housing 114, provides a thermal conductive pathway between the upper housing 114, the guide assembly 300 and the transducer assembly 10.

After the transducer assembly 10 has been secured in the sensor support 210, the sensor support 210 is coupled to the lower flange 112, the ball 320, guide assembly 300 and copper wool 330 are installed and the lower flange 112 is then coupled to the upper housing 114. When assembled, the lower flange 112 and upper housing 114 define an interior vacuum chamber 200.

To ensure that the vacuum chamber 200 is air-tight, a temporary air-tight copper seal is provided between the lower flange 112 and the upper housing 110. The vacuum port (not shown) provides fluid communication between the vacuum line 138 and the vacuum chamber 200. During the burn-out, evacuation and sealing steps, the external vacuum pump evacuates the vacuum chamber 200 to an ultra-high vacuum pressure via the vacuum line 138 and vacuum port.

Figure 6A:
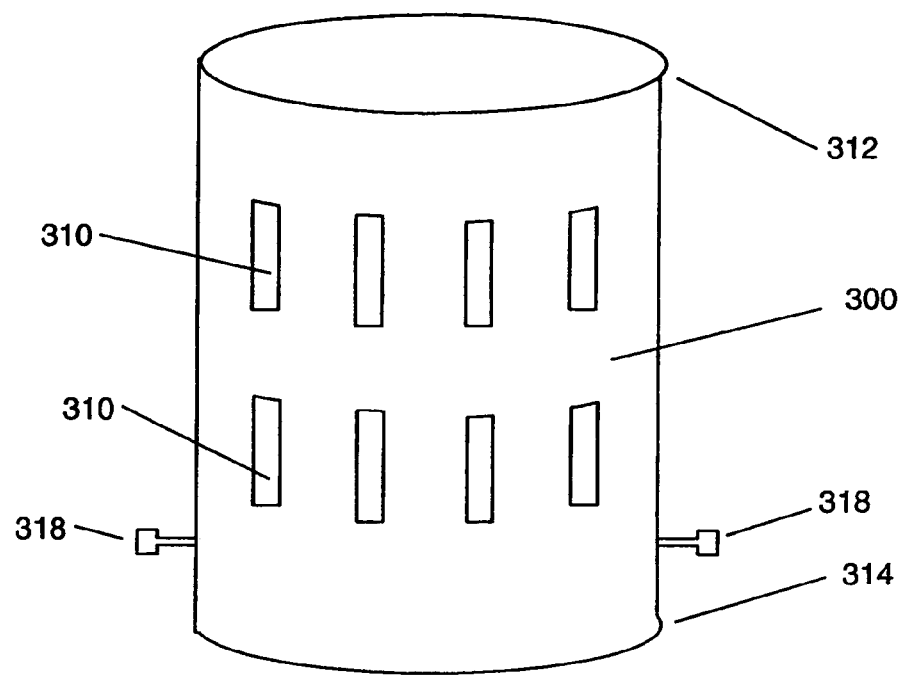
FIG. 6A shows a frame assembly constructed in accordance with the invention.
Figure 6B:
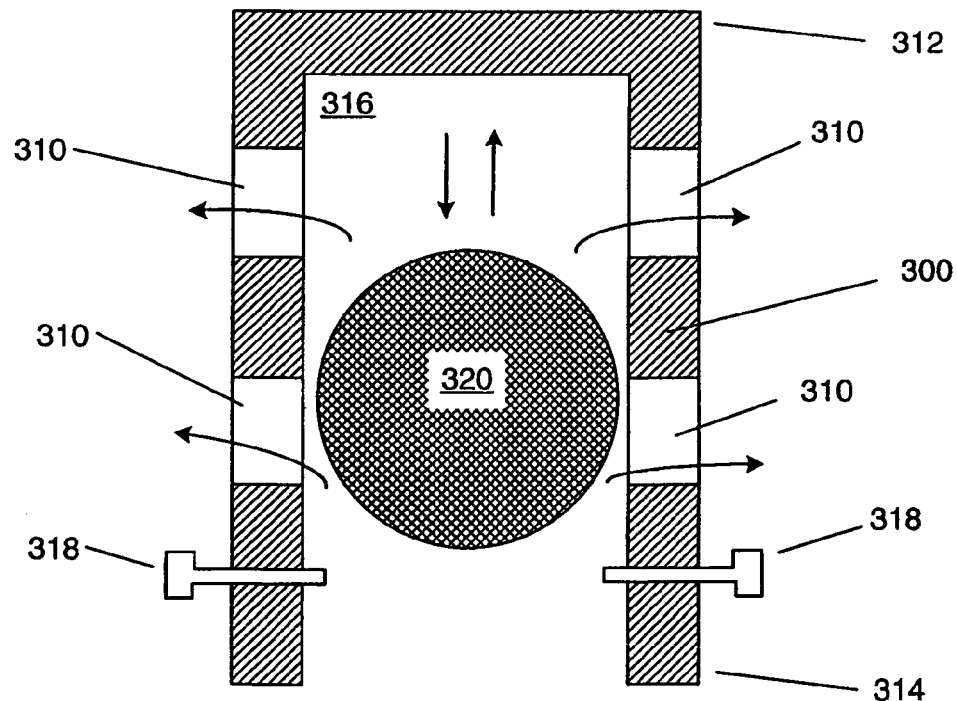
FIG. 6B shows a cross-section view of the frame assembly of FIG. 6A.

FIG. 6A shows the cylindrical guide assembly 300 in more detail, while FIG. 6B shows a cross-section view of the guide assembly 300 and how the ball 320 is disposed within the hollow portion of the guide assembly 300. The cylindrical guide assembly 300 defines a hollow cylindrical interior space 316 having a closed distal end 312 and an open proximal end 314. The ball 320 is disposed within the space 316 of the guide assembly 300 and, depending upon the orientation of the guide assembly 300, can move freely towards or away from the distal end 312 and the proximal end 314 of the guide assembly 300. To prevent excessive side-to-side motions (i.e., motions that are perpendicular to a line that is drawn between the distal end 312 and the proximal end 314) of the ball 320 within the space 316, the diameter of the ball 320 is closely matched to the diameter dimension of the space 316, i.e., the diameter of the ball 320 is slightly less than the diameter of the space 316. In one exemplary embodiment, for example, the diameter of the ball 320 is 0.5000±0.0001 inches and the diameter of the space 316 is 0.505±0.002 inches. The diameters of the ball 320 and space 361 are appropriately sized to account for any thermal expansion effects that may occur during the burn-out and evacuation process.

The interior space 316 of the guide assembly 300 is also sized and configured to accommodate the cover 82 and tube 80 that are temporarily disposed within the space 316. The tube 80 and cover 82 generally have the same radial dimension. The radial dimension of the space 316 is, therefore, established to be slightly larger than the radial dimensions of the cover 82 and tube 80.

The cylindrical guide assembly 300 further includes a set of holes 310 that are arranged radially throughout the guide assembly 300 and a set of tightening screws 318 that are disposed towards the proximal end of the guide assembly 300. The tightening screws 318 are used to temporarily secure the guide assembly 300 (with the ball 320 disposed therein) to the tube 80 during the burn-out, evacuation and sealing steps. The holes 310 provide a fluid pathway between the interior space 316 of the guide assembly 300 and the vacuum chamber 200. Thus, during the burn-out and evacuation process, i.e., when the cover 82 has not yet been sealed on the tube 80, fluid pathways exist between the reference chamber 52 and the vacuum chamber 200 via the aperture 48, hollow portion of the tube 80 and the holes 310.

FIG. 7A is a side view that illustrates how the vacuum housing 110, guide assembly 300 and ball 320 of the apparatus 100 are oriented during the burn-out and evacuation process. FIG. 7B shows a close-up, side view that more accurately depicts the orientation and arrangement of the tube 80, cover 82, guide assembly 300 and ball 320 of FIG. 7A. As previously discussed, prior to securing the transducer assembly 10 into the sensor support 210, low-temperature sealing material 94a is deposited onto the upper end of the tube 80 and the corresponding sealing area of the cover 82. After the transducer assembly 10 is secured in the sensor support 210 and the vacuum chamber 200 has been sealed and secured in the support assembly 120, the vacuum housing 110 is then rotated in a counterclockwise direction (as shown in FIG. 7A), i.e., forward, until the vacuum housing 110 comes to rest on the distal ends 122a of the lower supports 122. The distal ends 122a are located such that, upon rotation, the ball 320 and cover 82 which are located within the interior space 316 of the guide assembly 300 travel away from the tube 80 towards the distal end 312 of the guide assembly 300. Thus, by sufficiently rotating the vacuum housing 110, one can ensure that a gap (i.e., a fluid pathway) between the cover 82 and the tube 80 is present during burn-out and evacuation process. Once the transducer assembly 10 has been brought up to the desired burn-out temperature and an ultra-high vacuum pressure has been established and is being drawn in the vacuum chamber 200, the burn-out and evacuation processing of the transducer assembly 10 is then initiated. As is indicated by the arrows in FIG. 7B, the reference chamber 52 of the transducer assembly 10 is evacuated by drawing the contaminants and gases out of the assembly 10 and into the vacuum chamber 200 via the aperture 48 (not shown), the tube 80 and the holes 310 of the guide assembly 300. The contaminants and gases are then further drawn out of the vacuum chamber 300 by the external vacuum pump via the vacuum port and vacuum line 138.

The cable 116 can be manipulated to cause the vacuum housing 110 to rotate counterclockwise. The vacuum housing 110, for example, can be weighted so that a slackening of the cable 116 causes the vacuum housing 110 to rotate counterclockwise, i.e., forward.

Once the burn-out and evacuation process has been completed, the reference pressure in the reference chamber 52 is then locked in by sealing the cover 82 to the tube 80. FIG. 8A is a side view that illustrates how the vacuum housing 110, guide assembly 300 and ball 320 of the apparatus 100 are oriented during the cover sealing process. FIG. 8B shows a close-up, side view that more accurately depicts the orientation and arrangement of the tube 80, cover 82, guide assembly 300 and ball 320 of FIG. 8A. To seal the cover 82 onto the tube 80, the vacuum housing 110 of the apparatus 100 is rotated in a clockwise direction (as shown in FIG. 8A), i.e., backwards, to an upright position by pulling the cable 116 that is attached to the backside of the lower flange 112. Cable guides (not shown), such as pulley wheels or other types of devices or guides, can be utilized to facilitate the operation of the cable 116. When the vacuum housing 110 is pulled into its upright position, the lower flange 112 of the vacuum housing 110 will come to rest on the distal ends 124a of the upper supports 124 of the support assembly 120. The upright position need not be exactly vertical. Instead, it may be advantageous to position the distal ends 124a of the upper supports 124 so that, upon rotation, the vacuum housing 110 leans slightly backwards. That way, if the tension in the cable 116 slackens, the vacuum housing 110 is less likely to inadvertently rotate forward towards the distal ends 122a of the lower supports 122.

When vacuum housing 110 is rotated to its upright position, gravity causes the ball 320 to move towards the proximal end 314 of the guide assembly 300 which thereby causes the cover 82 to engage the tube 82 and, more specifically, causes the low-temperature sealing material 94a that is disposed on the bottom-side of the cover 82 to come into contact with the low-temperature sealing material 94a that is disposed on the upper end of the tube 80. As situated, the weight of the ball 320 and the weight of the cover 82 thus provide a contact force between the cover 82 and the tube 80 in the area of the low-temperature sealing material 94a interface. To seal the cover 82 onto the tube 80, i.e., to form the low-temperature seal 94, while the ultra-high vacuum is still being maintained in the vacuum chamber 200 the temperature in the oven is elevated to cause the two layers of low-temperature sealing material 94a to melt and fuse together. This increase in temperature also serves to activate the getter element 84 that is disposed in the tube 80. After the layers of low-temperature sealing material 94a have sufficiently melted and fused together, the temperature is lowered below the melting point of the low-temperature sealing material 94a and, upon cooling, the low-temperature air-tight seal 94 is thus formed between the cover 82 and the tube 80 (FIG. 8B). By blocking the last fluid pathway that existed between the reference chamber 52 and the external environment, i.e., the vacuum chamber 200, the reference pressure in the reference chamber 52 is thus established when the seal 94 is formed.

Once the seal 94 is formed, the oven and vacuum pump can be turned off and the completed transducer assembly 10 can be removed from the vacuum housing 110 and the guide assembly and ball 320 can be removed from the transducer assembly 10. The apparatus 100 can then be used to process another transducer assembly 10.

The apparatus 100 can be configured to process more than one transducer assembly 10 at a time. Instead of the cable 116, it may be advantageous to utilize an actuator rod(s) with an actuator motor to control the rotational orientation of the vacuum housing 110. Additionally, while the method and apparatus described herein have been directed to a transducer assembly 10 that measures an absolute pressure and utilizes a getter element, etc., the method and apparatus of the present invention can also be used to establish a reference pressure in a reference chamber of a wide variety of other gauge-type pressure transducer assemblies.

Figure 9:
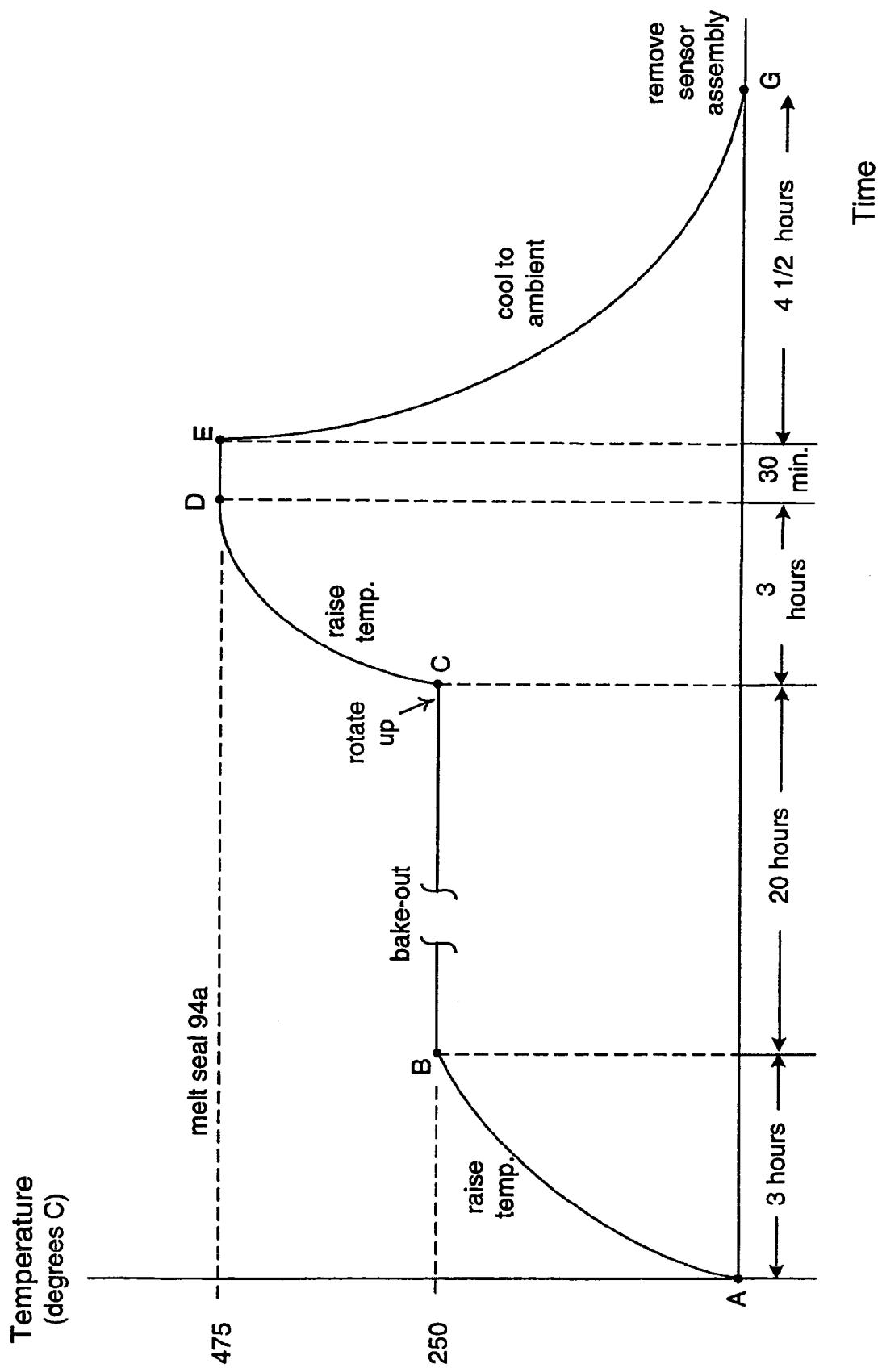
FIG. 9 illustrates a process flow for establishing a reference pressure within a reference chamber of a transducer assembly in accordance with the method and apparatus of the present disclosure.

FIG. 9 illustrates the burn-out, evacuation and sealing process of the present disclosure in more detail. In FIG. 9, the x-axis of the process flow represents Time and the y-axis represents Temperature in degrees Celsius. Prior to initiating the burn-out and evacuation process, at Step A of the process flow, the cover 82, ball 320, guide assembly 300 and pressure transducer assembly 10 are arranged in the vacuum chamber 200 of the vacuum housing 110 and the vacuum housing 110 is rotated counterclockwise (forward) as shown in FIGS. 7A and 7B. During Step A→B, over the course of three hours, the temperature in the vacuum chamber 200 is raised to a burn-out temperature of 250° C. and the pressure is lowered to an evacuation pressure of $10^{-8}$ Torr. After the burn-out temperature and evacuation pressure are achieved (Step B), the reference chamber 52 is burned-out and evacuated for 20 hours, Step B→C. Shortly before Step C is reached, the vacuum housing 100 is rotated clockwise (backwards) to the upright position as shown in FIGS. 8A and 8B. When rotated to the upright position, the movement of the ball 320 causes the cover 82 to move towards tube 80 and the two layers of low-temperature sealing material 94a to come into contact with each other. Once the burn-out and evacuation step is completed (Step C), the temperature in the vacuum chamber 200 is raised to 475° C., Step C→D, which causes the two layers of low-temperature sealing material 94a to melt. Step C→D lasts for three hours. The vacuum chamber 200 is then maintained at 475° C. for 30 minutes, Step D→E, to ensure that the layers of low-temperature sealing material 94*a* sufficiently melt together. Lastly, over the course of 4½ hours, the temperature and pressure in the vacuum chamber 200 are brought to ambient conditions and the assembled pressure transducer assembly 10 is then removed from the vacuum chamber 200 of the vacuum housing 110, Step E→G.

Figure 1A:
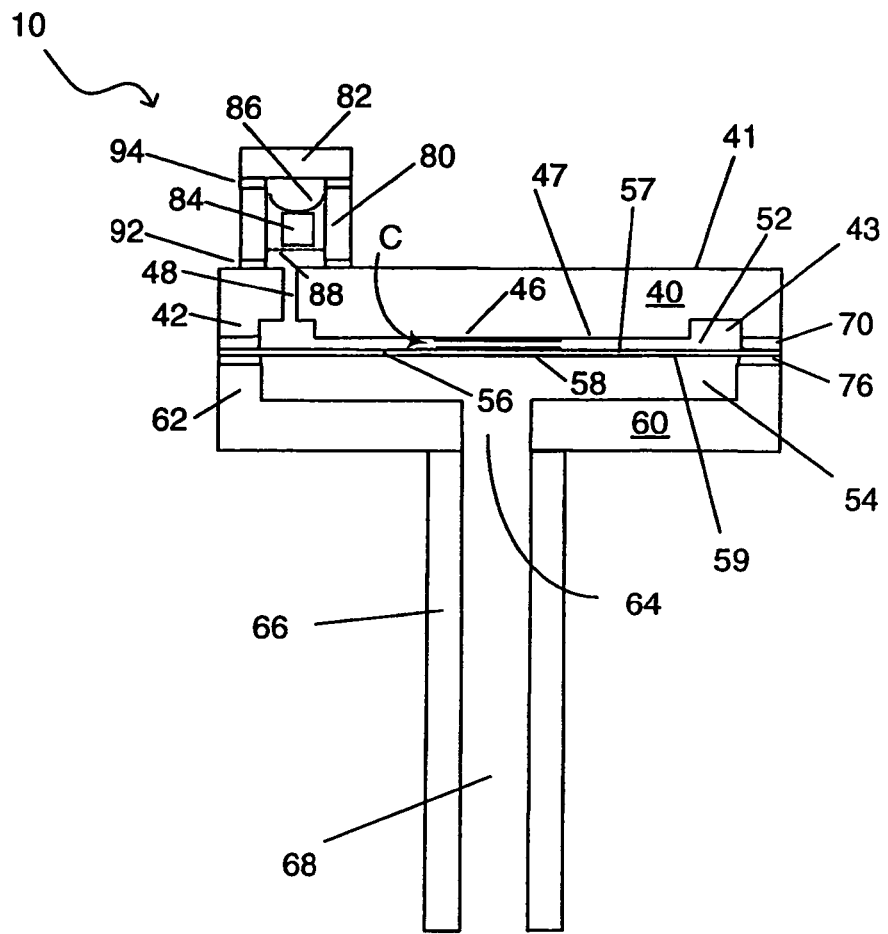
FIG. 1A shows a cross-sectional view of a prior art capacitance sensor.
Figure 1B:
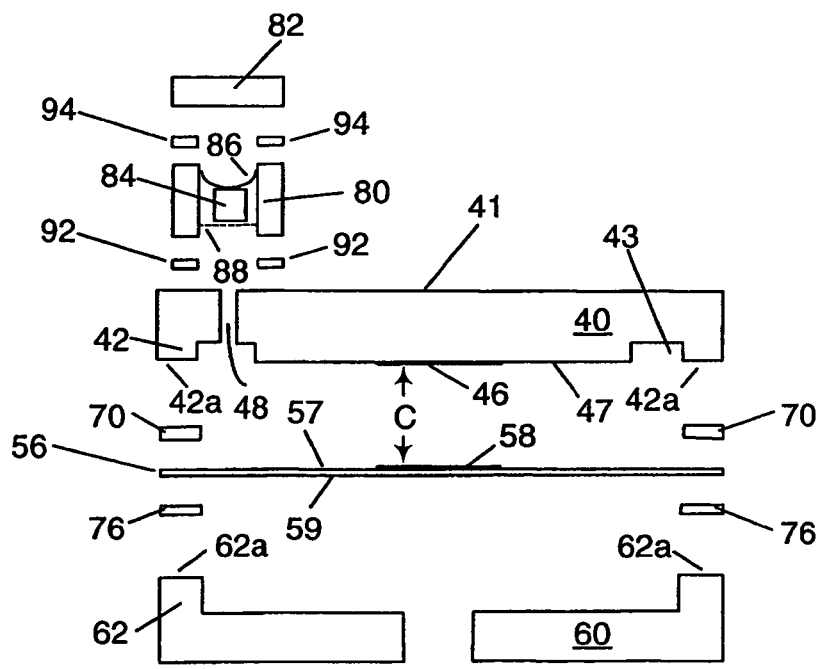
FIG. 1B shows partial, expanded cross-sectional view of the prior art capacitance sensor of FIG. 1A.
Figure 2A:
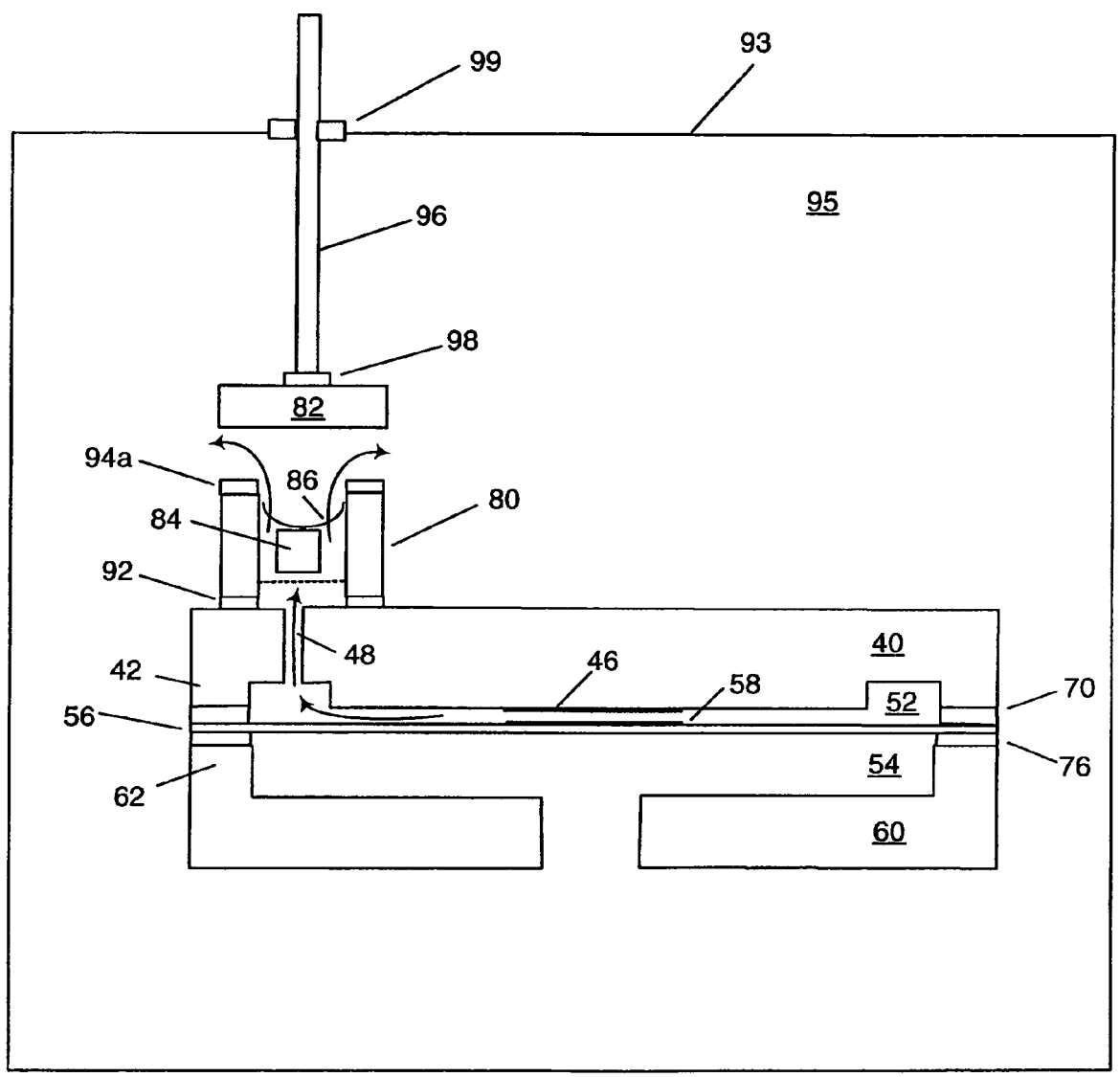
FIGS. 2A and 2B illustrate a prior art method and apparatus used to establish a reference pressure within a reference chamber of a capacitive pressure transducer assembly.
Figure 2B:
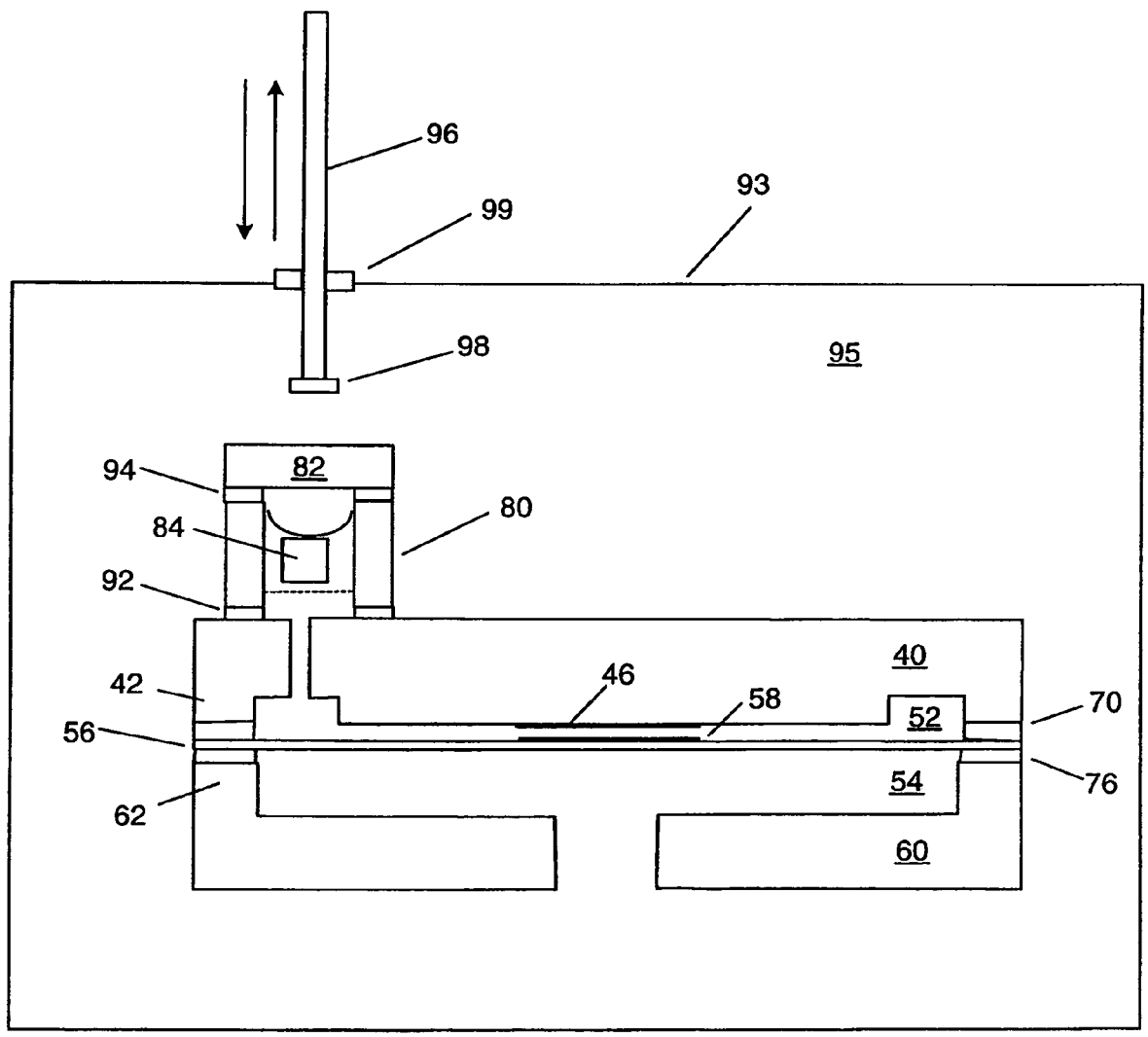
Figure 3:
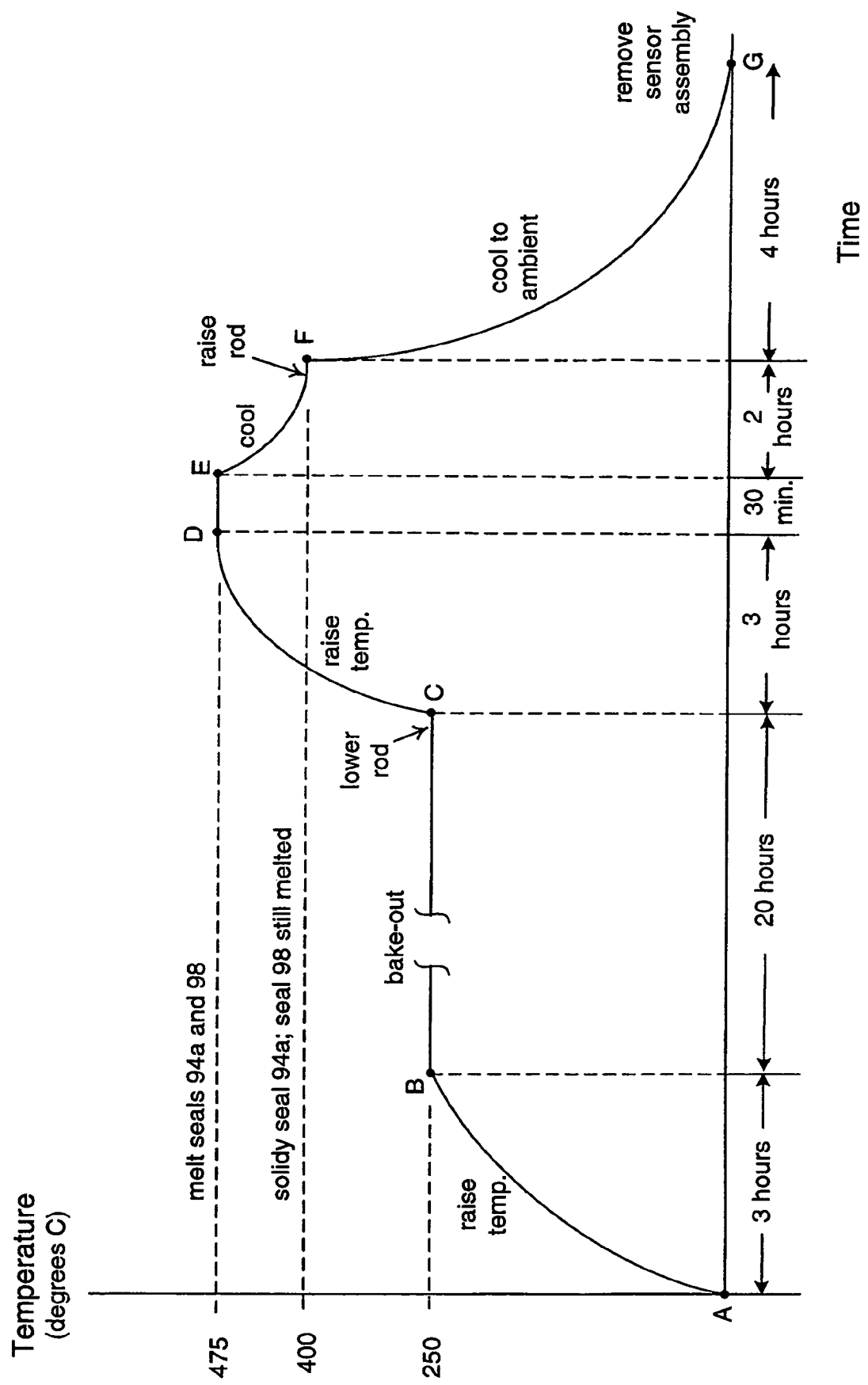
FIG. 3 depicts a process flow for establishing a reference pressure within a reference chamber of a transducer assembly in accordance with the prior art method and apparatus of FIGS. 2A and 2B.

By eliminating the intermediate temperature ramp down portion of the prior art method (Step E→F of FIG. 3), which is necessary forming the low-temperature seal 94 while maintaining the low-temperature seal 98 in a melted state, the burn-out, evacuation and sealing process of the present disclosure can be completed in as little as 31 hours. Thus, in addition to accurately establishing a reference pressure within a reference chamber, the present disclosure can also advantageously shorten the time that is required to perform the burn-out, evacuation and sealing process of the pressure transducer assembly 10.

Although various embodiments that incorporate the teachings of the present invention have been shown and described in detail herein, those skilled in the art can readily devise any other varied embodiments that incorporate these teachings.

What is claimed is:

1. A method for attaching a first part to a second part, the method comprising:
    depositing a sealing material on at least a portion of at least one of the first part and the second part;
    positioning the second part in a space defined by a guide such that gravity tends to pull the second part away from the first part;
    moving the first part, the second part, and the guide so that gravity tends to pull the second part toward the first part;
    melting the sealing material; and
    allowing the sealing material to cool.

2. The method of claim 1, the step of moving the first part and the second part comprising rotating the first part and the second part about an axis.

3. The method of claim 1, further comprising coupling the guide to a portion of the first part.

4. The method of claim 1, further comprising:
    providing a mass in the space, the first part being positioned between the mass and the second part.

5. The method of claim 4, the mass being a ball.

6. The method of claim 4, the mass comprising either Tungsten Carbide or Silicon Nitride.

7. An apparatus for use in joining a first part to a second part, a meltable joining material being disposed on at least a portion of at least one of the first part and the second part, the apparatus including:
    a chamber, the chamber being moveable between a first position and a second position, the chamber being sufficiently large to house the first part and the second part;
    a guide disposed within the chamber for guiding the second part, gravity tending to cause the first part and the second part to separate when the chamber is in the first position, gravity tending to cause the first part and the second part to be brought together when the chamber is in the second position; and
    a heater for selectively heating the chamber to a temperature sufficiently high to melt the joining material.

8. The apparatus of claim 7, further comprising:
    at least one rotation pin extending from the chamber;
    a support assembly, the support assembly comprising a support bracket having at least one hole that can accommodate the at least one rotation pin of the chamber; and
    the chamber being rotatable from the first position to the second position when the at least one rotation pin is engaged with the at least one hole.

9. The apparatus of claim 7, further comprising:
    a pressure port defined by the chamber; and
    a pressure line connected to a pressure source coupleable to the pressure port, the pressure source being capable of establishing a pressure condition in the chamber via the pressure line and the pressure port.

10. The apparatus of claim 7, further comprising:
    a weight, the second part being positioned between the weight and the first part.

11. The apparatus of claim 10, the guide defining a cylindrical volume and the weight being a ball, the ball being disposed in the cylindrical volume.

12. The apparatus of claim 10, the ball comprising either Tungsten Carbide or Silicon Nitride.

13. The apparatus of claim 8, the support assembly further comprising an upper support and a lower support, a portion of the chamber resting on the lower support when the pressure housing is in the first position and a portion of the chamber resting on the upper support when the chamber is in the second position.

14. The apparatus of claim 7, the chamber further comprising a cable for rotating the chamber from the first position to the second position.

15. The apparatus of claim 7, further comprising an actuator motor and an actuator rod that can be coupled to the chamber to control the rotational position of the chamber.

16. The apparatus of claim 7, the guide having a proximal end, a distal end, and holes located between the proximal end and the distal end.

\* \* \* \* \*

UNITED STATES PATENT AND TRADEMARK OFFICE
CERTIFICATE OF CORRECTION

PATENT NO.       : 7,624,643 B2                                                Page 1 of 1
APPLICATION NO.  : 11/542316
DATED            : December 1, 2009
INVENTOR(S)      : Chris P. Grudzien It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 689 days.

Signed and Sealed this

Twenty-sixth Day of October, 2010

David J. Kappos
*Director of the United States Patent and Trademark Office*